United States Patent
Kuroda et al.

(10) Patent No.: US 9,309,806 B2
(45) Date of Patent: Apr. 12, 2016

(54) ROTATIONAL DRIVE APPARATUS

(71) Applicant: DENSO CORPORATION, Kariya, Aichi-pref. (JP)

(72) Inventors: Tomonobu Kuroda, Chiryu (JP); Tetsuji Yamanaka, Obu (JP); Naoaki Kouno, Chiryu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/576,612

(22) Filed: Dec. 19, 2014

(65) Prior Publication Data

US 2015/0184584 A1   Jul. 2, 2015

(30) Foreign Application Priority Data

Dec. 27, 2013   (JP) ................. 2013-271814

(51) Int. Cl.
| | |
|---|---|
| *F16H 1/32* | (2006.01) |
| *H02K 7/116* | (2006.01) |
| *F02B 37/18* | (2006.01) |
| *F16H 57/021* | (2012.01) |
| *F16H 57/02* | (2012.01) |

(52) U.S. Cl.
CPC ............ *F02B 37/186* (2013.01); *F16H 1/32* (2013.01); *F16H 57/021* (2013.01); *F16H 2001/325* (2013.01); *F16H 2057/02034* (2013.01); *F16H 2057/02082* (2013.01); *H02K 7/116* (2013.01)

(58) Field of Classification Search
CPC ..... F02B 37/186; F16H 1/32; F16H 2001/323; F16H 2001/325
USPC .................... 475/168, 176, 177, 338
See application file for complete search history.

(56) References Cited

U.S. PATENT DOCUMENTS

| | | | |
|---|---|---|---|
| 6,743,137 B2 * | 6/2004 | Rilbe ................... | 475/163 |
| 2012/0100949 A1 | 4/2012 | Nagumo et al. | |
| 2014/0187373 A1 | 7/2014 | Yamanaka et al. | |

FOREIGN PATENT DOCUMENTS

JP     9-177905     7/1997

OTHER PUBLICATIONS

Kouno et al., U.S. Appl. No. 14/576,568, filed Dec. 19, 2014.

* cited by examiner

*Primary Examiner* — Colby M Hansen
(74) *Attorney, Agent, or Firm* — Nixon & Vanderhye P.C.

(57) ABSTRACT

A first internal gear of a speed reducer includes an internally-toothed portion and a bearing portion and is formed as a one-piece member that is formed separately from a first housing. The internally-toothed portion forms internal teeth, which are meshed with external teeth of a first planetary gear. The bearing portion includes an eleventh cylindrical surface, which supports a motor shaft. The internal teeth of the first internal gear are arranged coaxial with the eleventh cylindrical surface. The internal teeth of the first internal gear and the bearing portion are formed as portions of the one-piece member.

20 Claims, 17 Drawing Sheets

PERPENDICULAR DIRECTION

ROTATIONAL DRIVE APPARATUS

CROSS REFERENCE TO RELATED APPLICATION

This application is based on and incorporates herein by reference Japanese Patent Application No. 2013-271814 filed on Dec. 27, 2013.

TECHNICAL FIELD

The present disclosure relates to a rotational drive apparatus.

BACKGROUND

A known rotational drive apparatus includes an electric motor and a speed reducer, which are coaxially placed in a housing. The known rotational drive apparatus reduces a rotational speed of rotation, which is outputted from a motor shaft of the electric motor, through the speed reducer, and the known rotational drive apparatus outputs the rotation of the reduced rotational speed.

For example, JP2011-27254A (corresponding to US2012/0100949A1) discloses a speed reducer that includes a planetary gear apparatus. An internal gear of the planetary gear apparatus is formed integrally with a housing.

In JP2011-27254A (corresponding to US2012/0100949A1), a motor shaft of an electric motor is supported by a separate member, which is formed separately from the internal gear of the planetary gear apparatus. Therefore, there is a limit with respect to improvement of coaxiality between the internal gear and the motor shaft.

Although not recited in JP2011-27254A (corresponding to US2012/0100949A1), it is conceivable to form a support device, which supports the motor shaft, in a portion of the housing. However, in order to accurately form the internal gear and the support device in the housing, the number of manufacturing steps and the costs are disadvantageously increased. Furthermore, it is difficult to install the motor to such a housing.

SUMMARY

The present disclosure is made in view of the above disadvantages.

According to the present disclosure, there is provided a rotational drive apparatus, which includes a first housing, an electric motor, a second housing, an output shaft, an eccentric shaft, a first internal gear, a first planetary gear, and a rotation transmitting device. The electric motor is received in the first housing. The second housing is fitted to the first housing and is fixed to the first housing. The output shaft is coaxial with a motor shaft of the electric motor and is rotatably supported by the second housing. The eccentric shaft is eccentric to the motor shaft and is rotatable integrally with the motor shaft. The first internal gear is coaxial with the motor shaft and is non-rotatably fitted to the first housing. The first planetary gear is meshed with the first internal gear from a radially inner side of the first internal gear. The first planetary gear is rotatably supported by the eccentric shaft to enable rotation of the first planetary gear around the eccentric shaft. At a time of rotating the motor shaft, the first planetary gear revolves around the motor shaft while changing a meshed location of the first planetary gear that is meshed with the first internal gear, and the first planetary gear is rotated about the eccentric shaft at a reduced speed that is reduced from a rotational speed of the motor shaft. The rotation transmitting device transmits rotation of the first planetary gear, which is rotated about the eccentric shaft, to the output shaft. The first internal gear is a one-piece member and is formed separately from the first housing. The first internal gear includes an internally-toothed portion, a bearing portion, and a flange portion. The internally-toothed portion is configured into a tubular form and is fitted to the first housing. The internally-toothed portion has a plurality of internal teeth that are meshed with a plurality of external teeth of the first planetary gear. The bearing portion is configured into a tubular form and supports the motor shaft. The flange portion connects between the internally-toothed portion and the bearing portion.

BRIEF DESCRIPTION OF THE DRAWINGS

The drawings described herein are for illustration purposes only and are not intended to limit the scope of the present disclosure in any way.

DETAILED DESCRIPTION

Figure 1:
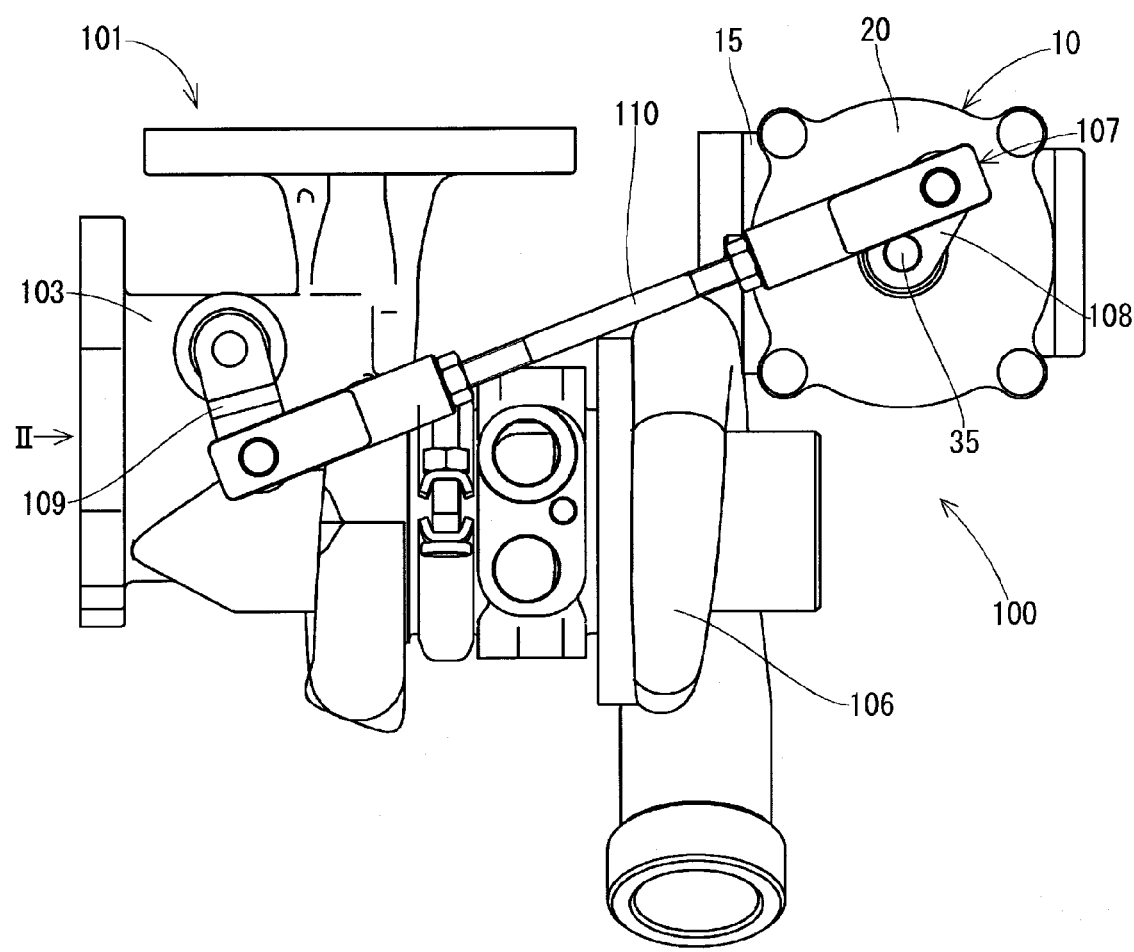
FIG. 1 is a schematic view of a waste gate valve apparatus, in which a rotational drive apparatus of a first embodiment of the present disclosure is applied.

Various embodiments of the present disclosure will be described with reference to the accompanying drawings. In the following discussion of the embodiments, similar components will be indicated by the same reference numerals and will not be described redundantly for the sake of simplicity.

First Embodiment

Figure 2:
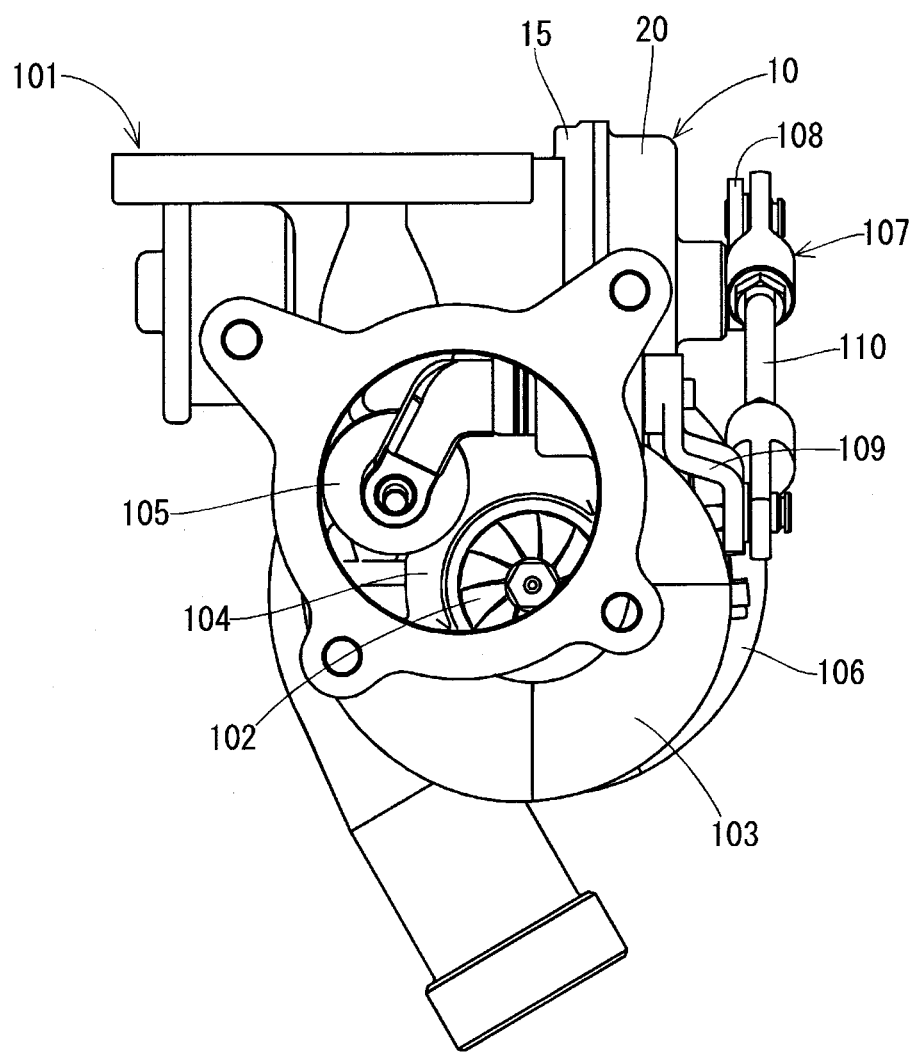
FIG. 2 is a view taken in a direction of an arrow II in FIG. 1, showing the waste gate valve apparatus according to the first embodiment.

A rotational drive apparatus of a first embodiment of the present disclosure will be used for a waste gate valve apparatus shown in FIGS. 1 and 2. The waste gate valve apparatus 100 is an apparatus that is placed in an exhaust gas bypass passage (branched passage) to conduct a portion of exhaust gas of a supercharged internal combustion engine to adjust a flow quantity of exhaust gas supplied to a turbine 102 of a turbocharger 101. By adjusting the flow quantity of the exhaust gas supplied to the turbine 102, a rotational speed of the turbocharger 101 is controlled, and thereby a stable boost pressure can be obtained.

First of all, a structure of the waste gate valve apparatus 100 will be described with reference to FIGS. 1 and 2.

The waste gate valve apparatus 100 includes a waste gate valve 105, a rotational drive apparatus 10, and a link mechanism 107. The waste gate valve 105 is placed in a turbine housing 103. The rotational drive apparatus 10 is fixed to an outer wall of a compressor housing 106. The link mechanism 107 connects between an output shaft 35 of the rotational drive apparatus 10 and the waste gate valve 105. The turbine housing 103 forms a partition wall 104, which partitions between an inlet and an outlet of the exhaust gas. The waste gate valve 105 opens or closes a bypass hole (not shown) of the partition wall 104.

The link mechanism 107 includes a first lever 108, a second lever 109, and a rod 110. The first lever 108 is connected to the output shaft 35. The second lever 109 is connected to a rotatable shaft of the waste gate valve 105. The rod 110 connects between the first lever 108 and the second lever 109. The link mechanism 107 is a four-bar linkage, which has one degree of freedom. The rotation of the output shaft 35 is conducted to the rotatable shaft of the waste gate valve 105 through the link mechanism 107 upon reducing a rotational speed of rotation, which is outputted from the output shaft 35, through conversion of a swing motion of the first lever 108 into a swing motion of the second lever 109. A ratio between a length of the first lever 108 and a length of the second lever 109 is preset such that a total speed reducing ratio, which is a sum of a speed reducing ratio of the link mechanism 107 and a speed reducing ratio of a speed reducer of the rotational drive apparatus 10, becomes a predetermined value.

Next, the structure of the rotational drive apparatus 10 will be described with reference to FIGS. 3 to 12.

Figure 3:
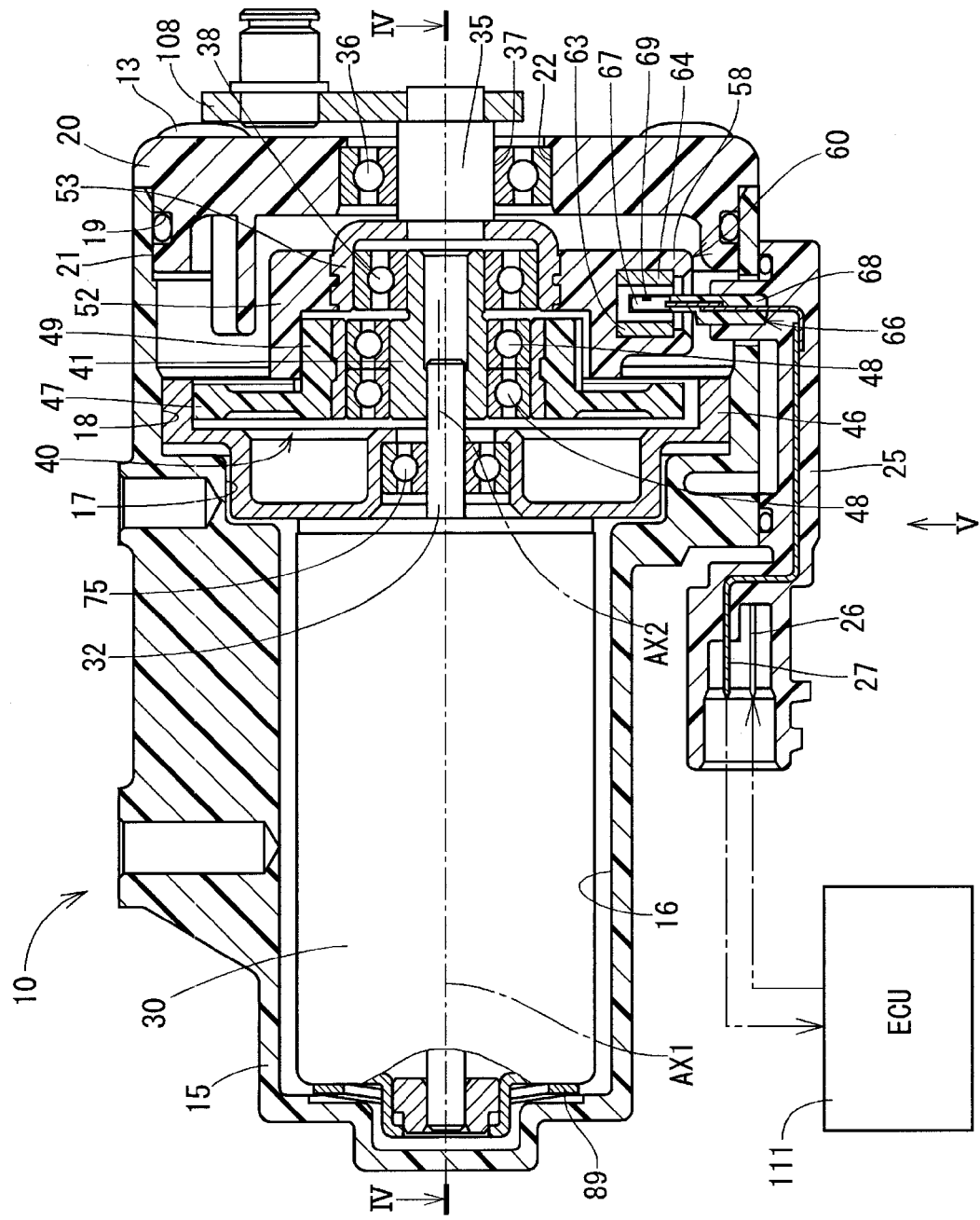
FIG. 3 is a longitudinal cross-sectional view of the rotational drive apparatus shown in FIG. 1.

As shown in FIG. 3, the rotational drive apparatus 10 includes a first housing 15, a second housing 20, a connector 25, an electric motor (hereinafter also simply referred to as a motor) 30, the output shaft 35, the speed reducer 40, and a rotational angle sensing device (also referred to as rotational angle sensing means) 60.

Figure 4:
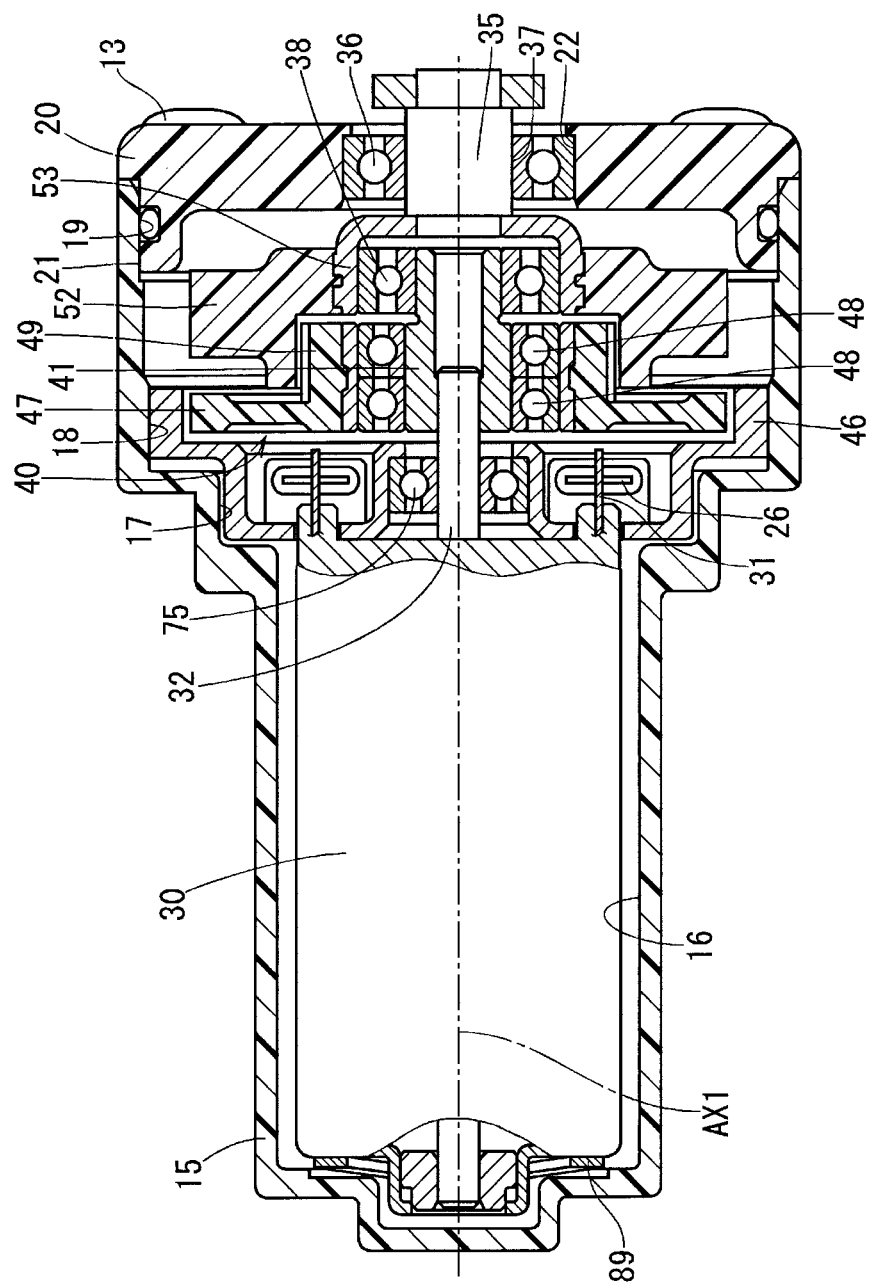
FIG. 4 is a cross sectional view taken along line IV-IV in FIG. 3.

With reference to FIGS. 3 and 4, the first housing 15 is made of, for example, an aluminum alloy and is configured into a cup form. An inner wall of the first housing 15 includes a first cylindrical surface 16, a second cylindrical surface 17, a third cylindrical surface 18, and a fourth cylindrical surface 19, which are arranged in this order in the axial direction from an axial side that is opposite from the second housing 20. An inner diameter of the first cylindrical surface 16, an inner diameter of the second cylindrical surface 17, an inner diameter of the third cylindrical surface 18, and an inner diameter of the fourth cylindrical surface 19 increase in this order. The fourth cylindrical surface 19 is coaxial with the third cylindrical surface 18.

The second housing 20 is made of, for example, an aluminum alloy and is configured into a cup form. A fifth cylindrical surface 21, which is an outer wall surface of a tubular portion of the second housing 20, is engaged with the fourth cylindrical surface 19 of the first housing 15. A sixth cylindrical surface 22, which is an inner wall surface of a hole that extends through a bottom portion of the second housing 20, is coaxial with the fifth cylindrical surface 21. The first housing 15 and the second housing 20 are integrally fixed together by screws 13.

Figure 5:
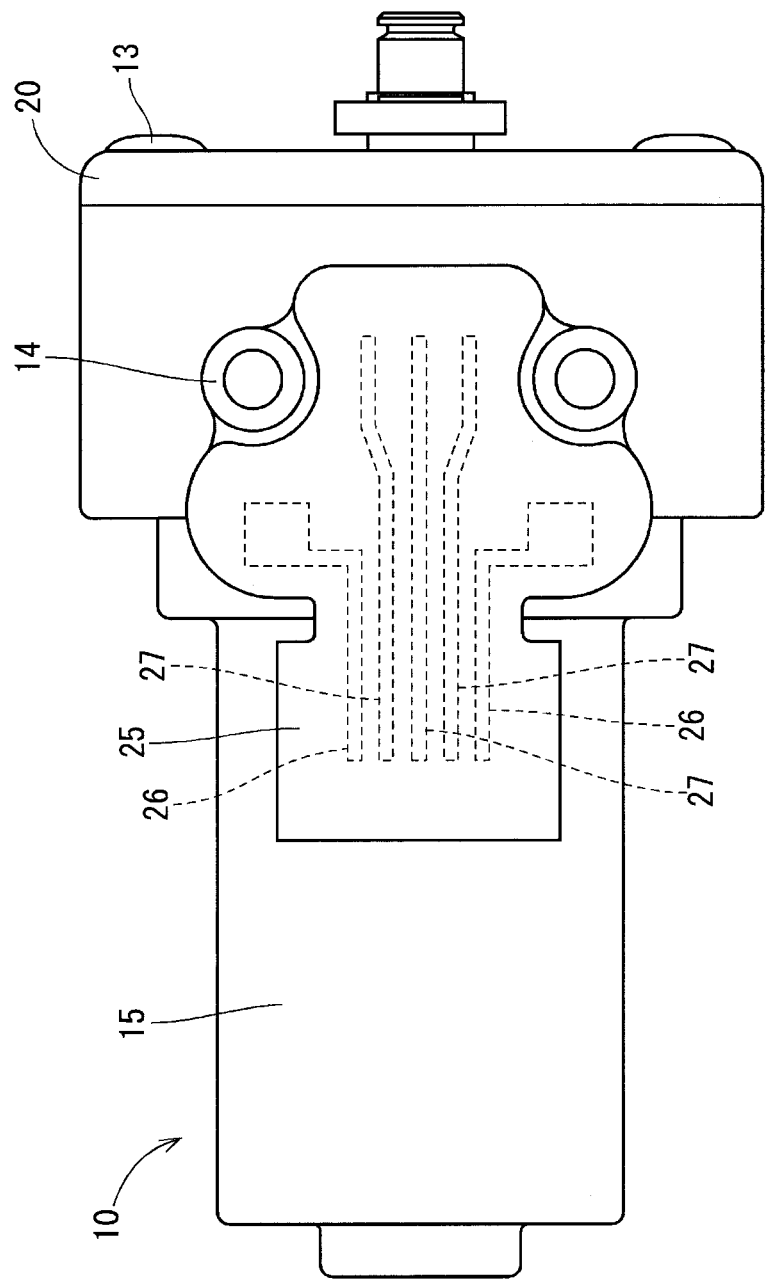
FIG. 5 is a view taken in a direction of an arrow V in FIG. 3, showing the rotational drive apparatus of the first embodiment.

As shown in FIGS. 3 and 5, the connector 25 is assembled to the outer wall of the first housing 15 and is fixed to the first housing 15 with screws 14. Furthermore, the connector 25 includes power terminals 26 and signal terminals 27. The power terminals 26 are connected to motor terminals 31 of the motor 30, and the signal terminals 27 are connected to the rotational angle sensing device 60.

As shown in FIGS. 3 and 4, a main portion of the motor 30 is received in a corresponding location, which is located on a radially inner side of the first cylindrical surface 16 of the first housing 15. The motor shaft 32 of the motor 30 projects into a location, which is on a radially inner side of the second cylindrical surface 17 and the third cylindrical surface 18. In the present embodiment, the motor 30 is a DC motor. As shown in FIGS. 3 to 7, the motor 30 is electrically connected to an electronic control device 111 through the power terminals 26. The motor shaft 32 is rotated when an electric power is supplied to the motor 30 through the electronic control device 111.

As shown in FIGS. 3 and 4, the output shaft 35 is rotatably supported by the second housing 20 through a bearing 36, which is fitted to the sixth cylindrical surface 22.

Figure 6:
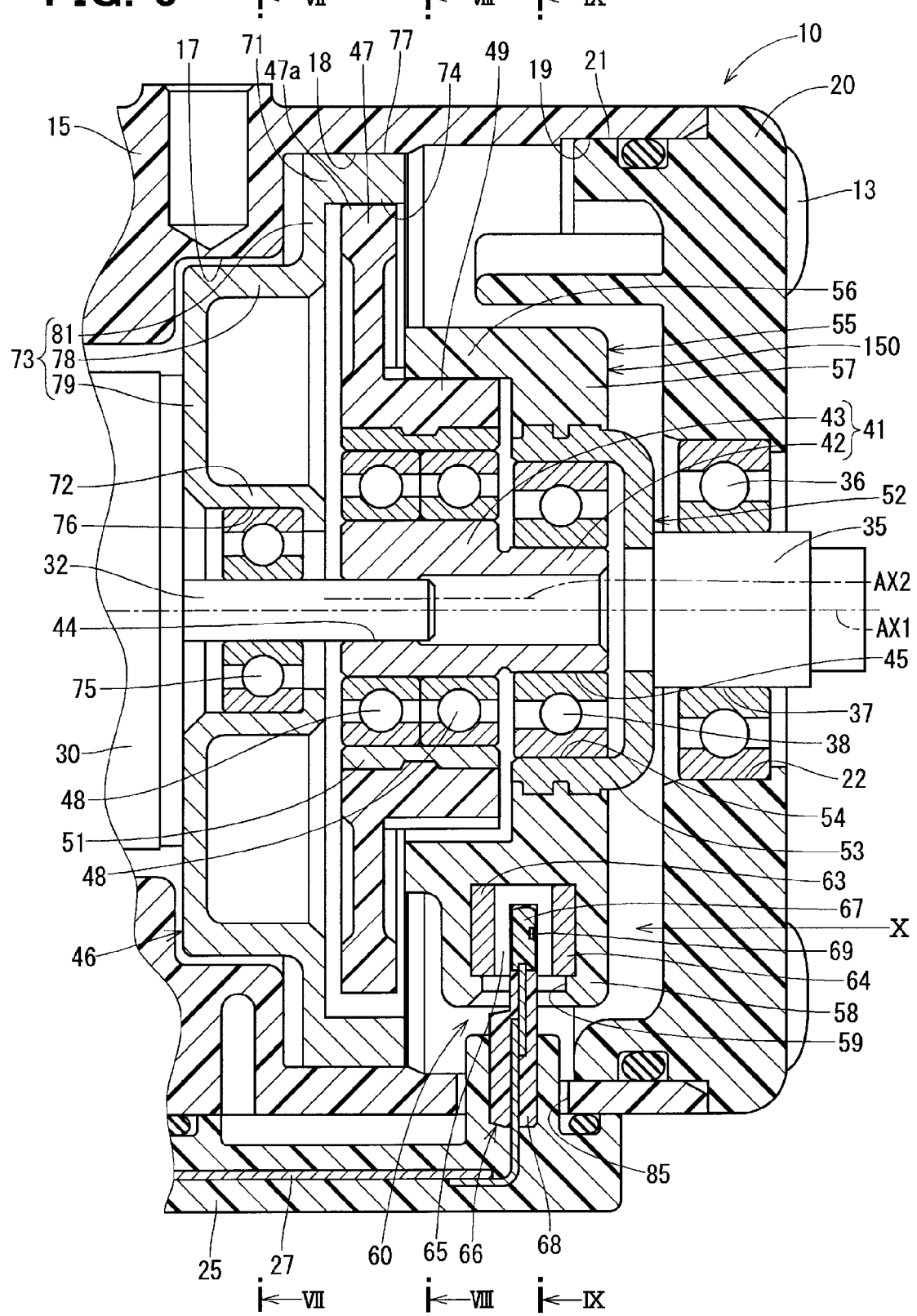
FIG. 6 is a partial enlarged cross-sectional view, showing the speed reducer and an area around the speed reducer of FIG. 3.
Figure 7:
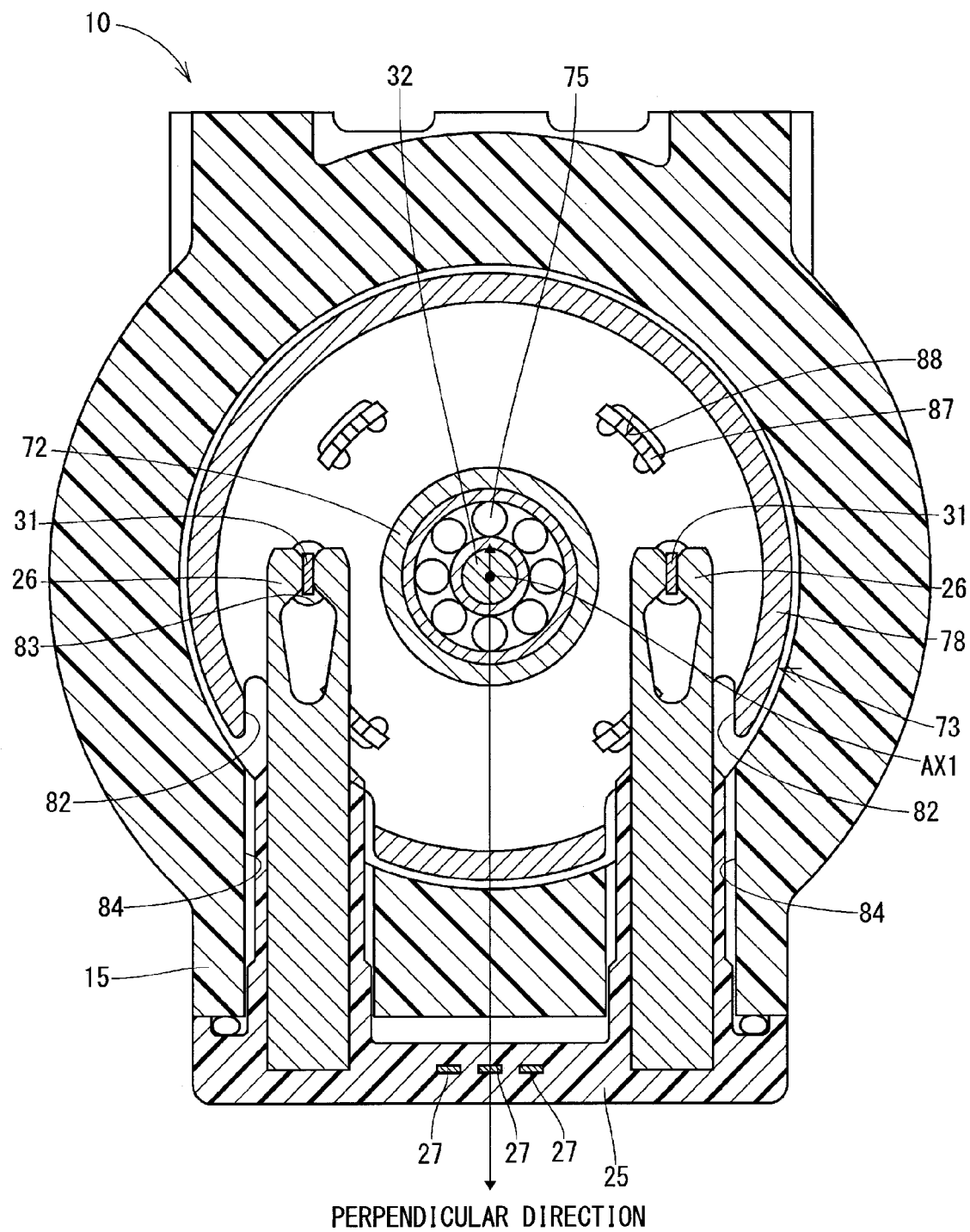
FIG. 7 is a cross-sectional view taken along line VII-VII in FIG. 6.

As shown in FIGS. 3, 4 and 6, the speed reducer 40 is a planetary gear device and includes an eccentric shaft 41, a first internal gear 46, a first planetary gear 47, a second planetary gear 49, and an output member (serving as a final speed reducing member) 52.

Figure 8:
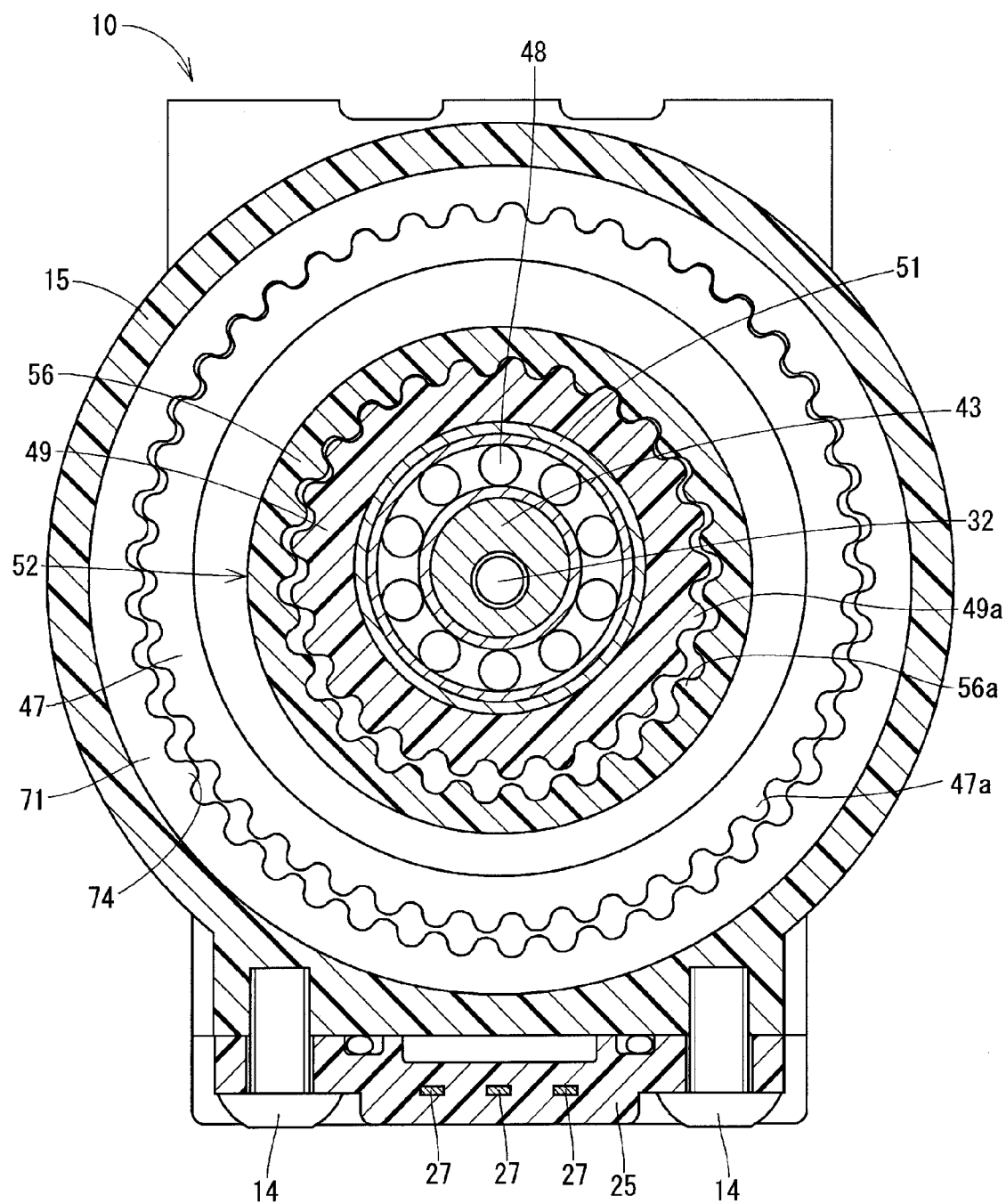
FIG. 8 is a cross-sectional view taken along line VIII-VIII in FIG. 6.

As shown in FIGS. 3, 6 and 8, the eccentric shaft 41 includes a coaxial portion 42 and an eccentric portion 43. The coaxial portion 42 is fitted to the motor shaft 32, and the eccentric portion 43 radially outwardly projects from an end part of the coaxial portion 42, which is located on a side where the motor 30 is placed. The coaxial portion 42 includes a seventh cylindrical surface 44 and an eighth cylindrical surface 45. The seventh cylindrical surface 44 is fitted to the motor shaft 32, and the eighth cylindrical surface 45 is an outer wall surface of the coaxial portion 42. The eighth cylindrical surface 45 is coaxial with the seventh cylindrical surface 44. An eccentric axis AX2, which is an axis of the eccentric portion 43, is eccentric to a rotational axis AX1 of the motor shaft 32. The eccentric shaft 41 is rotatable integrally with the motor shaft 32. In the present embodiment, the coaxial portion 42 of the eccentric shaft 41 is securely press fitted to the motor shaft 32.

As shown in FIGS. 3, 4, and 6 to 8, the first internal gear 46 is coaxial with the motor shaft 32 and is non-rotatably fitted to the first housing 15. In the present embodiment, the first internal gear 46 is securely press fitted to the third cylindrical surface 18 of the first housing 15.

As shown in FIGS. 3, 4, 6 and 8, the first planetary gear 47 is an external gear that is coaxial with the eccentric portion 43 of the eccentric shaft 41, and the first planetary gear 47 is meshed with the first internal gear 46 from a radially inner side of the first internal gear 46. The first planetary gear 47 is rotatably supported by the eccentric portion 43 of the eccentric shaft 41 through a bearing 48 in such a manner that the first planetary gear 47 is rotatable about the eccentric axis AX2.

As shown in FIG. 8, in the present embodiment, each tooth of the first internal gear 46 and each tooth of the first planetary gear 47 are configured into a trochoidal tooth shape. The number of internal teeth 74 of the first internal gear 46 is 45 (forty five), and the number of external teeth 47a of the first planetary gear 47 is 44 (forty four). A difference between the number of the internal teeth 74 of the first internal gear 46 and the number of the external teeth 47a of the first planetary gear 47 is 1 (one).

The first planetary gear 47 and the first internal gear 46 form a first speed reducing arrangement of the speed reducer 40. At the time of rotating the motor shaft 32, the first planetary gear 47 revolves around the rotational axis AX1 of the motor shaft 32 while changing a meshed location (meshed teeth) of the first planetary gear 47 that is meshed with the first internal gear 46, and the first planetary gear 47 is rotated about the eccentric axis AX2 of the eccentric shaft 41 at a reduced speed that is reduced from a rotational speed of the motor shaft 32.

As shown in FIGS. 3, 4, 6, 8 and 9, the second planetary gear 49 is an external gear that is coaxial with the eccentric portion 43 of the eccentric shaft 41, and the second planetary gear 49 is supported by the eccentric portion 43 of the eccentric shaft 41 through the bearing 48 such that the second planetary gear 49 is rotatable about the eccentric axis AX2. The second planetary gear 49 is rotatable integrally with the first planetary gear 47. In the present embodiment, the first planetary gear 47 and the second planetary gear 49 are integrally and seamlessly formed as a one-piece member, and a cylindrical tubular member 51, which is made of metal and is fitted to an outer race of the bearing 48, is molded integrally with the first planetary gear 47 and the second planetary gear 49. The first planetary gear 47 and the second planetary gear 49 are made of fluorine resin or a material (a composite material) that contains the fluorine resin.

The output member 52 includes a rotatable body 53 and a second internal gear 55.

The rotatable body 53 is coaxial with the output shaft 35 and is rotatably supported by the eighth cylindrical surface 45 of the coaxial portion 42 of the eccentric shaft 41 through a bearing 38, so that the rotatable body 53 rotates integrally with the output shaft 35. In the present embodiment, the rotatable body 53 is made of metal and includes a tubular portion, which is fitted to an outer race of the bearing 38, and a bottom portion, which is securely press fitted to the output shaft 35. A ninth cylindrical surface 54, which is an inner wall surface of the tubular portion of the rotatable body 53, is coaxial with a tenth cylindrical surface 37 of the output shaft 35, to which the bearing 36 is fitted.

The second internal gear 55 is coaxial with the output shaft 35 and is rotatable integrally with the rotatable body 53. Specifically, the second internal gear 55 is made of resin and includes an internally-toothed portion 56, a connection 57 and a projection 58. The internally-toothed portion 56 is configured into a tubular form and is meshed with the second planetary gear 49 from the radially outer side of the second planetary gear 49. Specifically, internal teeth 56a of the internally-toothed portion 56 are meshed with external teeth 49a of the second planetary gear 49. The connection 57 is molded from the resin to cover the outer wall of the tubular portion of the rotatable body 53. The projection 58 is configured into an arcuate form (a sector form) and radially outwardly projects from the internally-toothed portion 56 and the connection 57. The projection 58 has a recess (radial recess) 59 that radially outwardly opens and extends in a circumferential direction.

In the present embodiment, each tooth of the second internal gear 55 and each tooth of the second planetary gear 49 are configured into a trochoidal tooth shape. An outer diameter of the internally-toothed portion 56 is smaller than an outer diameter of the first planetary gear 47. Furthermore, the number of the external teeth 49a of the second planetary gear 49 is 25 (twenty five), and the number of the internal teeth 56a of the second internal gear 55 is 26 (twenty six). A difference between the number of the external teeth 49a of the second planetary gear 49 and the number of the internal teeth 56a of the second internal gear 55 is 1 (one).

The second planetary gear 49 and the second internal gear 55 (or the output member 52 including the second internal gear 55 and the rotatable body 53) form a second speed reducing arrangement of the speed reducer 40 and serve as a rotation transmitting device (rotation transmitting means) 150 of the present disclosure, which transmits rotation of the first planetary gear 47 about the eccentric shaft 41 to the rotatable body 53. When the second planetary gear 49 is rotated about the eccentric axis AX2 integrally with the first planetary gear 47 and is revolved about the rotational axis AX1, the second internal gear 55 is rotated about the rotational axis AX1 at a rotational speed, which is reduced from a rotational speed of the rotation of the second planetary gear 49 about the eccentric axis AX2.

Figure 9:
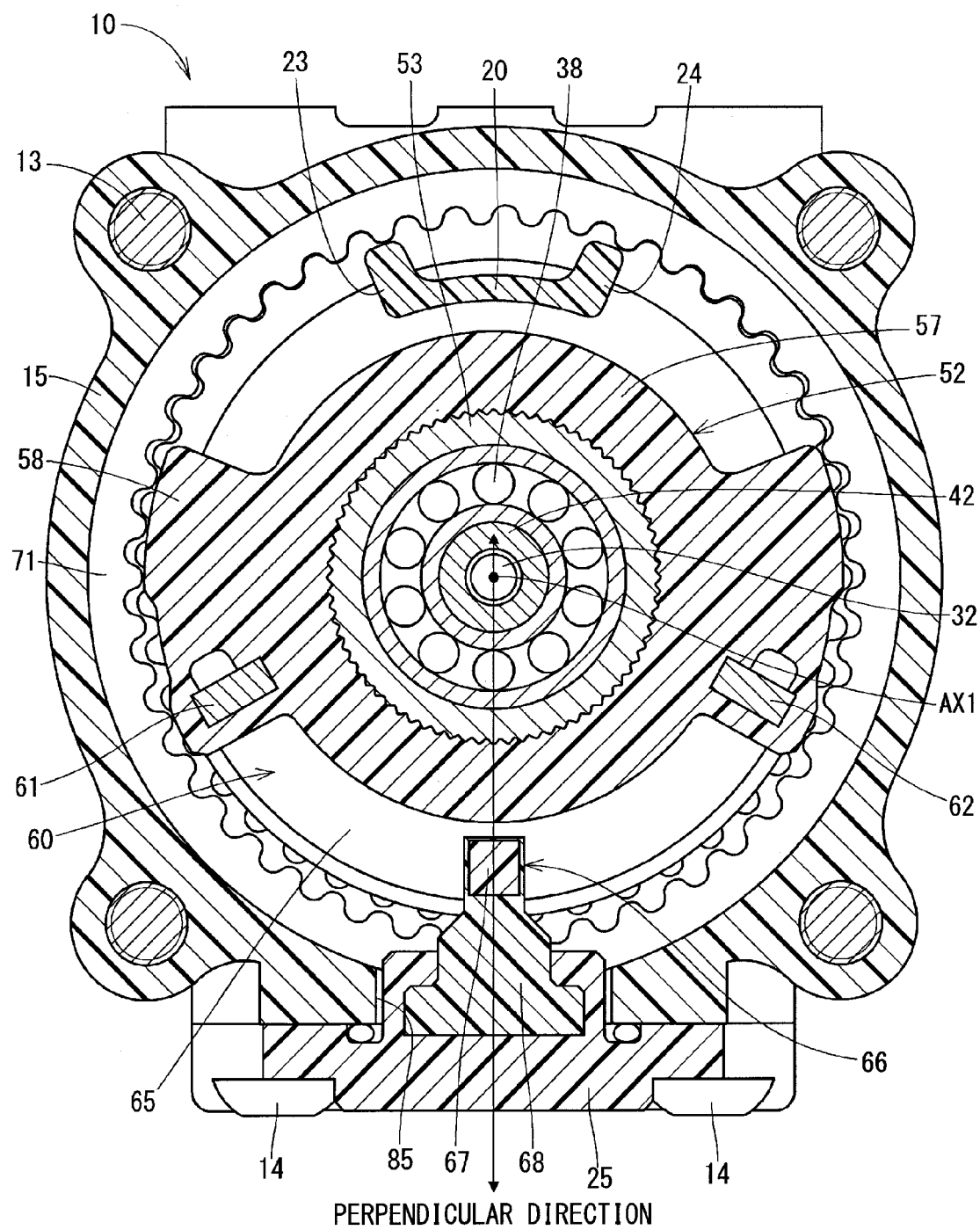
FIG. 9 is a cross-sectional view taken along line IX-IX in FIG. 6.
Figure 10:
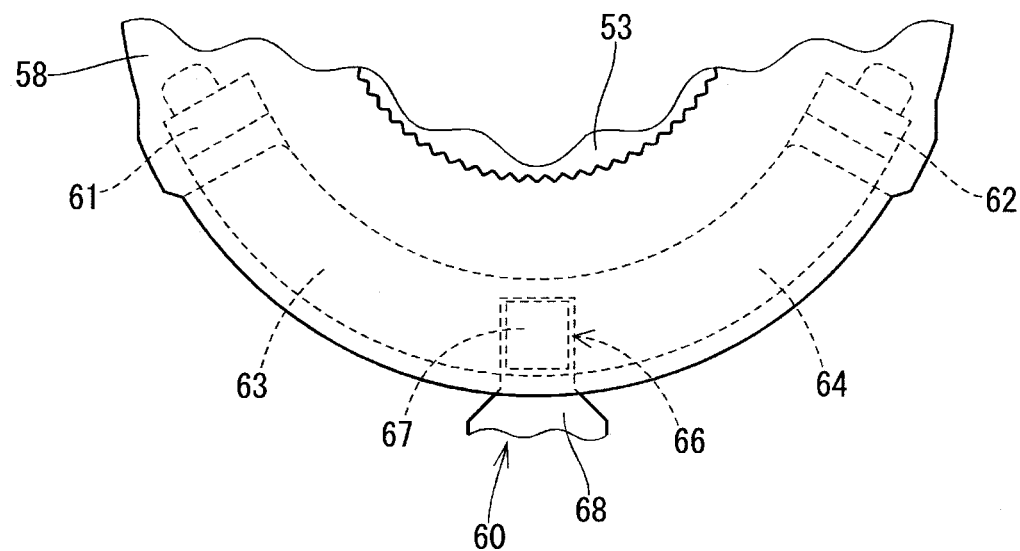
FIG. 10 is a view taken in a direction of an arrow X in FIG. 6, showing an output member and a rotational angle sensing device shown in FIG. 6.

As shown in FIG. 9, the second housing 20 has a full closing side stopper 23 and a full opening side stopper 24. The output member 52 is rotatable relative to the second housing 20 from a position, at which the projection 58 of the second internal gear 55 contacts the full closing side stopper 23, to a position, at which the projection 58 of the second internal gear 55 contacts the full opening side stopper 24. Hereinafter, the rotatable range of the output member 52 relative to the second housing 20 will be referred to as a movable range (rotatable range) of the output member 52. Furthermore, the position, at which the output member 52 contacts the full closing side stopper 23, will be referred to as an Act full closing position, and the position, at which the output member 52 contacts the full opening side stopper 24, will be referred to as an Act full opening position.

As shown in FIGS. 3, 6, 9 and 10, the rotational angle sensing device 60 is placed at a location, which axially coincides with a location of the output member 52 (more specifically, a location of the second internal gear 55) and is radially displaced from the rotational axis AX1. The rotational angle sensing device 60 senses a rotational angle of the output member 52 (or a rotational angle of the output shaft 35). The rotational angle sensing device 60 includes a first magnet (first permanent magnet) 61, a second magnet (second permanent magnet) 62, a first yoke 63, a second yoke 64, and a magnetic flux density sensing device (a magnetic flux density sensing means) 66.

The first magnet 61 is placed at one end of the recess 59 of the output member 52 in the rotational direction and is magnetized in one direction that is parallel to the axial direction.

The second magnet 62 is placed at the other end of the recess 59 of the output member 52, which is opposite from the one end of the recess 59 in the rotational direction. The second magnet 62 is magnetized in an opposite direction, which is parallel to the axial direction and is opposite from the one direction (i.e., opposite from the magnetizing direction of the first magnet 61).

The first yoke 63 is configured into an arcuate form and extends in the rotational direction along an inner wall surface of the recess 59 of the output member 52, which is located on one axial side. The first yoke 63 connects between a north pole (N-pole) of the first magnet 61 and a south pole (S-pole) of the second magnet 62.

The second yoke 64 is configured into an arcuate form and extends in the rotational direction along another inner wall surface of the recess 59 of the output member 52, which is located on the other axial side. The second yoke 64 connects between a north pole (N-pole) of the second magnet 62 and a south pole (S-pole) of the first magnet 61.

The first magnet 61, the second magnet 62, the first yoke 63, and the second yoke 64 form a closed magnetic circuit, which radially outwardly opens.

Magnetic fluxes, which are outputted from the north pole of the first magnet 61, include a return magnetic flux, a leakage magnet flux and a directly-passing magnetic flux. The return magnetic flux, which is outputted from the north pole of the first magnet 61, flows to the south pole of the second magnet 62 through the first yoke 63. The leakage magnetic flux, which is outputted from the north pole of the first magnet 61, flows from the first yoke 63 to the second yoke 64 through a gap 65, which is formed between the first yoke 63 and the second yoke 64. The directly passing magnetic flux, which is outputted from the north pole of the first magnet 61, flows to the south pole of the first magnet 61 through the gap 65 without passing through the first yoke 63 and the second yoke 64.

Magnetic fluxes, which are outputted from the north pole of the second magnet 62, include a return magnetic flux, a leakage magnet flux and a directly-passing magnetic flux. The return magnetic flux, which is outputted from the north pole of the second magnet 62, flows to the south pole of the first magnet 61 through the second yoke 64. The leakage magnetic flux, which is outputted from the north pole of the second magnet 62, flows from the second yoke 64 to the first yoke 63 through the gap 65. The directly-passing magnetic flux, which is outputted from the north pole of the second magnet 62, flows to the south pole of the second magnet 62 through the gap 65 without passing through the second yoke 64 and the first yoke 63.

The magnetic flux density sensing device 66 is placed in an inside of the closed magnetic circuit and includes a Hall IC 67 and a molded member 68. The Hall IC 67 is electrically connected to the electronic control device 111 through the signal terminals 27. The Hall IC 67 serves as a magnetism sensing device of the present disclosure and includes a Hall element(s) 69 and various correcting devices (not shown). The molded member 68 is a resin member that is molded to cover the Hall IC 67 and is molded integrally with the connector 25.

A density of the magnetic flux, which passes through the gap 65 between the first yoke 63 and the second yoke 64, is increased or decreased in response to a change in a relative rotational angle of the output member 52 relative to the magnetic flux density sensing device 66. The Hall element 69 serves as a magnetic flux density sensing element of the present disclosure and outputs a signal, which corresponds to a density of the magnetic flux that passes through a magnetism sensing surface of the Hall element 69.

Figure 11:
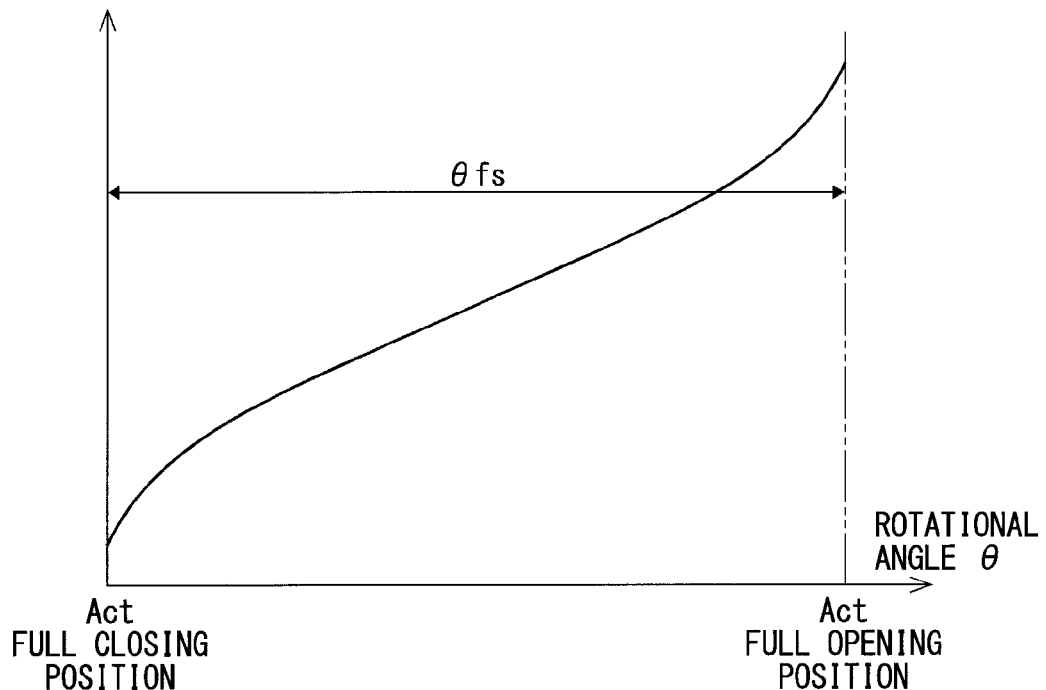
FIG. 11 is a diagram showing an output characteristic of a Hall element shown in FIG. 3.

A relationship between an output signal V of the Hall element 69 and a rotational angle θ of the output member 52 is deviated from a linear relationship due to an influence of the directly-passing magnetic flux discussed above at an area around the Act full closing position and an area around the Act full opening position, as shown in FIG. 11.

Figure 12:
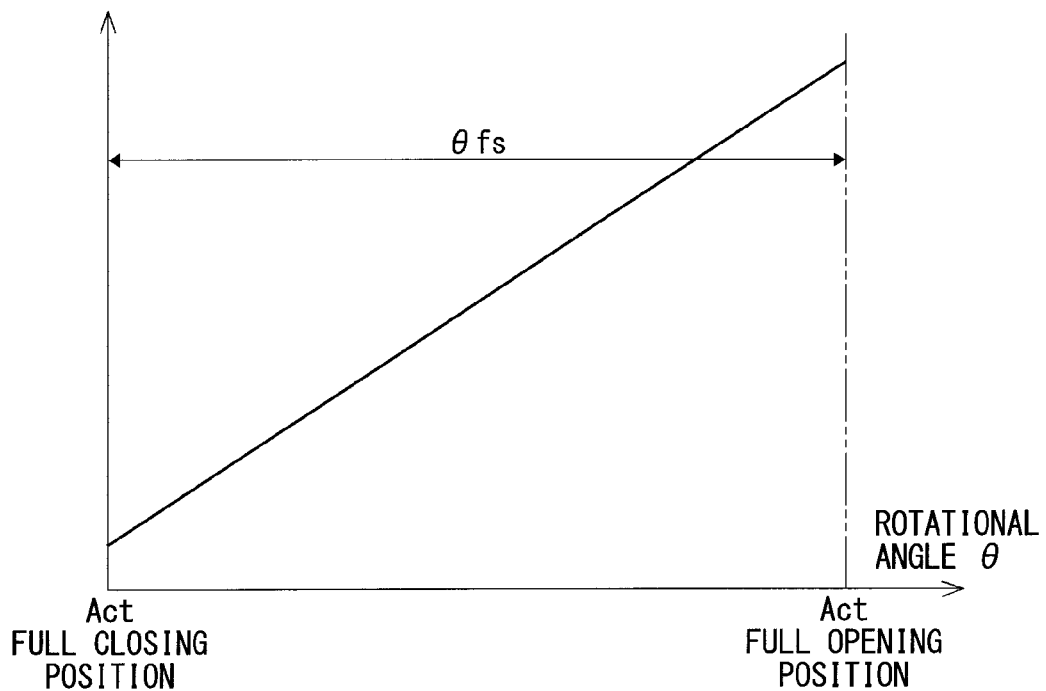
FIG. 12 is a diagram showing an output characteristic after correction made by a correcting device of a Hall IC shown in FIG. 3.
Figure 13:
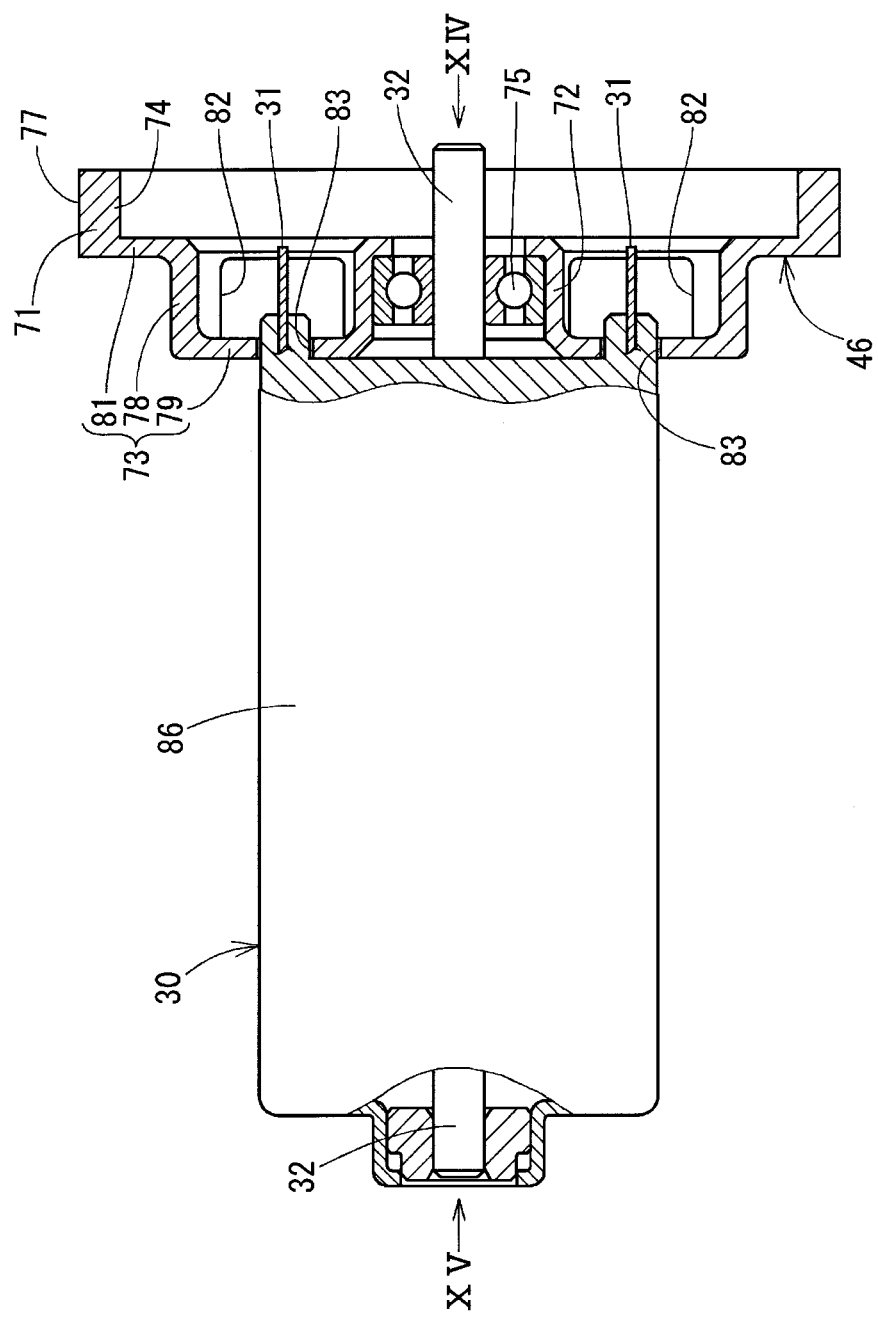
FIG. 13 is a cross-sectional view showing a subassembly of the electric motor and a first internal gear shown in FIG. 3.

The Hall IC 67 has a correcting device, which uses a multipoint correction method, to correct the output signal V of the Hall element 69 in the movable range θfs shown in FIG. 11 to a corrected output signal Vh shown in FIG. 12. Thereby, the Hall IC 67 can implement a linear output characteristic such that the change of the output of the Hall IC 67 relative to the rotational angle θ of the output member 52 becomes a linear change. In this way, the computation of the rotational angle θ can be easily made based on the corrected output signal Vh.

In the rotational drive apparatus 10, which is constructed in the above-described manner, when the electric power is supplied from the electronic control device 111 to the motor 30, the motor 30 rotates the output shaft 35, and the signal, which corresponds to the rotational angle of the output member 52, is outputted from the rotational angle sensing device 60 to the electronic control device 111. The electronic control device 111 drives the motor 30 based on the output signal of the rotational angle sensing device 60 and executes a feedback control operation in such a manner that the rotational angle of the output member 52 coincides with a target valve.

Next, details of the structure of the first internal gear 46 will be described with reference to FIGS. 6, 7, and 13-15.

The first internal gear 46 is integrally and seamlessly formed as a one-piece member, which includes an internally-toothed portion 71, a bearing portion 72 and a flange portion 73 and is formed separately from the first housing 15.

The internally-toothed portion 71 is configured into a tubular form and is press fitted to the third cylindrical surface 18 of the first housing 15. More specifically, an outer peripheral part of the internally-toothed portion 71, which is located on a radially outer side of the internal teeth 74, is press fitted to the third cylindrical surface 18 of the first housing 15. Desirably, a gap is formed between the first housing 15 and a flange section 81 of the first housing 15. That is, the first housing 15 is spaced away from the flange section 81. Thus, the rest of the first internal gear 46, which is other than the outer peripheral part of the internally-toothed portion 71 located on the radially outer side of the plurality of internal teeth 74, is spaced away from the first housing 15. In other words, the first internal gear 46 contacts the first housing 15 only at the outer peripheral part of the internally-toothed portion 71 located on the radially outer side of the plurality of internal teeth 74. The internal teeth 74, which are meshed with the external teeth 47a of the first planetary gear 47, are formed in an inner wall of the internally-toothed portion 71. In the present embodiment, in the state where the outer diameter of the first internal gear 46 is reduced upon the press fitting of the internally-toothed portion 71 of the first internal gear 46 to the third cylindrical surface 18, an ideal meshed state between the internal teeth 74 of the first internal gear 46 and the external teeth 47a of the first planetary gear 47 is achieved. That is, the internal teeth 74 are designed such that a circumferential gap between tips of each circumferentially adjacent two of the internal teeth 74 is larger in a state before the press fitting of the first internal gear 46 to the third cylindrical surface 18 in comparison to a state after the press fitting of the first internal gear 46 to the third cylindrical surface 18.

The bearing portion 72 is configured into a tubular form and supports the motor shaft 32 through a bearing 75. Furthermore, the bearing portion 72 is placed at a location that is axially displaced from the internally-toothed portion 71. Specifically, the bearing portion 72 is placed at the location, which is located on a radially inner side of the second cylindrical surface 17 of the first housing 15. The internal teeth 74 are coaxially arranged with respect an eleventh cylindrical surface 76, which is an inner wall surface of the bearing portion 72, and a twelfth cylindrical surface 77, which is an outer wall surface of the internally-toothed portion 71.

The flange portion 73 is configured into a cup form and connects between the internally-toothed portion 71 and the bearing portion 72. Specifically, the flange portion 73 includes a tubular section 78, a bottom section 79 and the flange section 81. The tubular section 78 is located on a radially outer side of the bearing portion 72. The bottom section 79 connects between an end part of the tubular section 78, which is axially opposite from the internally-toothed portion 71, and the bearing portion 72. The flange section 81 connects between another end part of the tubular section 78, which is axially located on a side where the internally-toothed portion 71 is placed, and the internally-toothed portion 71.

Figure 14:
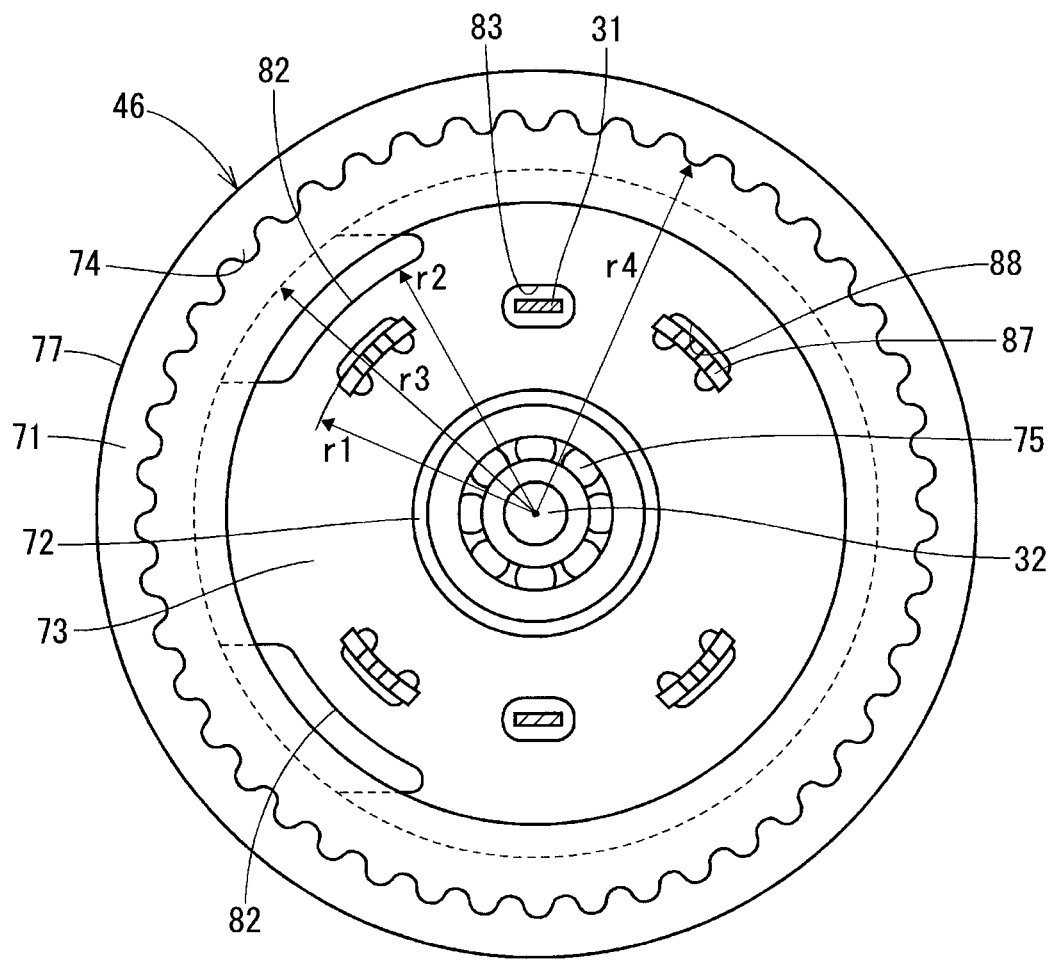
FIG. 14 is a view taken in a direction of an arrow XIV in FIG. 13, showing the electric motor and the first internal gear shown in FIG. 13.
Figure 15:
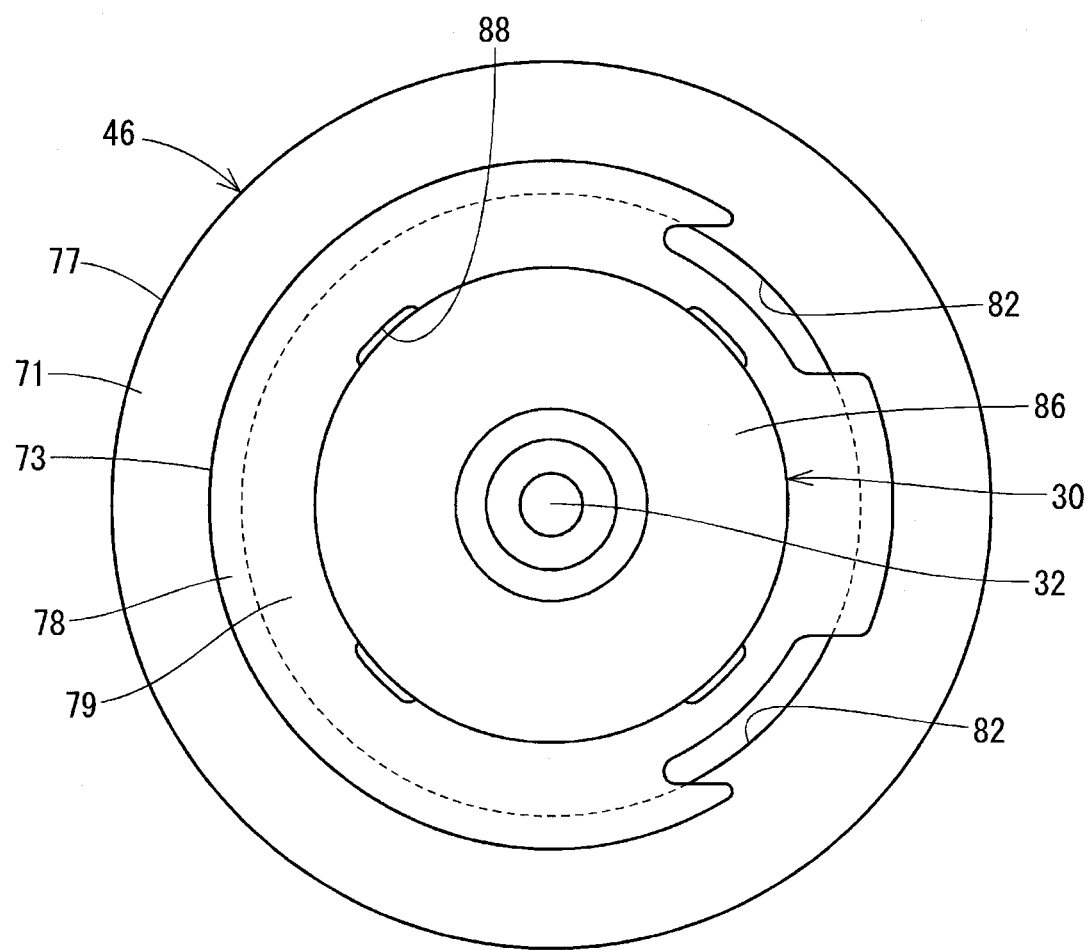
FIG. 15 is a view taken in a direction of an arrow XV in FIG. 13, showing the electric motor and the first internal gear shown in FIG. 13.

The tubular section 78 of the flange portion 73 has primary through-holes 82 that radially extend through the tubular section 78. The primary through-holes 82 axially open toward the bottom section 79 of the flange portion 73. As shown in FIG. 14, a minimum radius r2 of each primary through-hole 82 is larger than a maximum radius r1 of an outer surface (outer peripheral surface) of a yoke 86 of the motor 30. Furthermore, a maximum radius r3 of each primary through-hole 82 is smaller than a radius r4 of an addendum circle of the internal teeth 74.

The bottom section 79 of the flange portion 73 has secondary through-holes 83, which axially extend through the bottom section 79 and receive the motor terminals 31 of the motor 30.

Here, a direction, which is perpendicular to the rotational axis AX1 of the motor shaft 32, is defined as a perpendicular direction, and a direction, which is parallel to the perpendicular direction, is defined as a parallel direction. The first housing 15 has two tertiary through-holes 84 that extend through the first housing 15 in the parallel direction and is communicated with the primary through-holes 82 of the first internal gear 46. The first housing 15 also has a quaternary through-hole 85 that is located on a radially outer side of the closed magnetic circuit and extends through the first housing 15 in the perpendicular direction.

The power terminals 26 extend through the tertiary through-holes 84 and the primary through-holes 82 and are connected to the motor terminals 31. The magnetic flux density sensing device 66 of the rotational angle sensing device 60 extends through the quaternary through-hole 85 and has the Hall IC 67 placed in the gap 65. In the present embodiment, the power terminals 26, the signal terminals 27, and the magnetic flux density sensing device 66 are insert molded into the connector 25, which is a one-piece member and is made of resin. Electrical connection of the power terminals 26, the signal terminals 27, and the magnetic flux density sensing device 66 will be completed by moving the connector 25 in the perpendicular direction relative to the first housing 15.

The bottom section 79 of the flange portion 73 has quinary through-holes 88, which axially extend through the bottom section 79, and fixing claws 87 of the yoke 86 of the motor 30 are received through the quinary through-holes 88, respectively. In the present embodiment, the number of the quinary through-holes 88 is 4 (four). The motor 30 is fixed to the first internal gear 46 by, for example, bending the fixing claws 87, which are received through the quinary through-holes 88, respectively. The motor 30 is urged against the flange portion 73 by a wave washer 89 from a side, which is axially opposite from the first internal gear 46. The wave washer 89 serves as an urging member of the present disclosure.

As discussed above, in the first embodiment, the first internal gear 46 of the speed reducer 40 is the one-piece member, which includes the internally-toothed portion 71, the bearing portion 72 and the flange portion 73, and the first internal gear 46 is formed separately from the first housing 15. The internally-toothed portion 71 forms the internal teeth 74, which are meshed with the external teeth 47a of the first planetary gear 47. The bearing portion 72 includes the eleventh cylindrical surface 76, which supports the motor shaft 32. The internal teeth 74 are arranged coaxial with the eleventh cylindrical surface 76.

The internal teeth 74 and the bearing portion 72 of the first internal gear 46 are formed as the portions of the one-piece member, so that it is relatively easy to accurately establish the positional relationship (predetermined positional relationship) between the internal teeth 74 and the bearing portion 72. The coaxiality between the internal teeth 74 of the first internal gear 46 and the motor shaft 32 of the motor 30 can be improved by accurately forming the first internal gear 46.

Furthermore, in the first embodiment, the eleventh cylindrical surface 76 of the first internal gear 46, which supports the motor shaft 32, is coaxial with the twelfth cylindrical surface 77 of the first internal gear 46, which is press fitted to the third cylindrical surface 18 of the first housing 15. Furthermore, the third cylindrical surface 18 of the first housing 15 is coaxial with the fourth cylindrical surface 19 of the first housing 15, which is fitted to the fifth cylindrical surface 21 of the second housing 20. Furthermore, the fifth cylindrical surface 21 of the second housing 20 is coaxial with the sixth cylindrical surface 22 of the second housing 20, which supports the tenth cylindrical surface 37 of the output shaft 35. The tenth cylindrical surface 37 of the output shaft 35 is coaxial with the ninth cylindrical surface 54 of the rotatable body 53, which supports the eighth cylindrical surface 45 of the coaxial portion 42 of the eccentric shaft 41. Furthermore, the eighth cylindrical surface 45 of the coaxial portion 42 of the eccentric shaft 41 is coaxial with the seventh cylindrical surface 44 of the eccentric shaft 41, to which the motor shaft 32 is press fitted.

Therefore, the positioning accuracy of each corresponding component relative to the motor shaft 32 can be set by the coaxiality of each corresponding cylindrical surface. The coaxiality of each corresponding cylindrical surface can be accurately made in a relatively easy manner by, for example, a lathe machining process. Therefore, the positional accuracy of each corresponding component with respect to the motor shaft 32 is improved, and thereby the speed reducer, which has the high transmission efficiency, can be constructed.

Furthermore, in the first embodiment, the second planetary gear 49 and the second internal gear 55 form the second speed reducing arrangement of the speed reducer 40. At the time of rotating the second planetary gear 49 integrally with the first planetary gear 47 about the eccentric shaft 41 while revolving the second planetary gear 49 about the motor shaft 32, the second internal gear 55 rotates about the motor shaft 32 at a reduced rotational speed that is reduced from a rotational speed of the second planetary gear 49, which is rotated about the eccentric shaft 41.

Therefore, the rotation, which has the reduced rotational speed that is reduced by the first speed reducing arrangement including the first internal gear 46 and the first planetary gear 47, is outputted from the speed reducer 40 after further reducing the rotational speed of the rotation outputted from the first speed reducing arrangement through the second speed reducing arrangement including the second planetary gear 49 and the second internal gear 55. Therefore, it is possible to achieve a high speed reducing ratio by adjusting a speed reducing ratio of the first speed reducing arrangement and a speed reducing ratio of the second speed reducing arrangement.

Furthermore, in the first embodiment, each tooth of the first internal gear 46, each tooth of the first planetary gear 47, each tooth of the second internal gear 55 and each tooth of the second planetary gear are configured into a trochoidal tooth shape.

Therefore, in comparison to gears having an involute tooth shape, the number of meshed teeth of each gear can be increased. Therefore, a stress, which is exerted against a flank of the tooth of each gear, can be reduced. Furthermore, in comparison to the gears having the involute tooth shape, a trochoid interference and/or an involute interference can be more easily avoided, and thereby a degree of freedom with respect to selection of the number of teeth of each gear can be increased.

Furthermore, in the first embodiment, the difference between the number of the internal teeth 74 of the first internal gear 46 and the number of the external teeth 47a of the first planetary gear 47 is 1 (one).

Therefore, the high speed reducing ratio of the speed reducer 40 can be achieved while the size of the speed reducer 40 is reduced or minimized.

Furthermore, in the first embodiment, the second planetary gear 49 is formed by the one-piece member, which also forms the first planetary gear 47, and the second planetary gear 49 and the first planetary gear 47 are made of the fluorine resin or the material that contains the fluorine resin.

Thus, the meshed portions of the gears of the speed reducer 40 can be appropriately lubricated by making the first planetary gear 47 and the second planetary gear 49 from the fluorine resin or the material that contains the fluorine resin. That is, it is not required to implement the lubricating measures to the multiple members.

Furthermore, in the first embodiment, the internally-toothed portion 71 of the first internal gear 46 is axially displaced from the bearing portion 72. The flange portion 73 of the first internal gear 46 includes the tubular section 78 and the bottom section 79. The tubular section 78 is located on the radially outer side of the bearing portion 72 and is connected to the internally-toothed portion 71. The bottom section 79 connects between the end part of the tubular section 78, which is axially opposite from the internally-toothed portion 71, and the bearing portion 72. The tubular section 78 of the flange portion 73 has the primary through-holes 82 that radially extend through the tubular section 78. The bottom section 79 of the flange portion 73 has the secondary through-holes 83, which axially extend through the bottom section 79 and receive the motor terminals 31 of the motor 30.

Therefore, the axial space, which is provided to support the motor shaft 32, is effectively used to establish the electrical connections of the motor 30. Thus, it is possible to reduce or minimize the axial size of the rotational drive apparatus 10.

Furthermore, in the first embodiment, the first housing 15 has the tertiary through-holes 84 that extend through the first housing 15 in the parallel direction and are communicated with the primary through-holes 82 of the first internal gear 46. The power terminals 26 of the connector 25 are inserted through the tertiary through-holes 84 and the primary through-holes 82 and are connected to the motor terminals 31.

In this way, the operation for connecting the power terminals 26 to the motor terminals 31 is completed through the insertion of the power terminals 26 in the parallel direction.

Thus, the electrical connections of the motor 30 can be simplified, and the number of the components and the number of steps can be reduced.

Furthermore, in the first embodiment, the primary through-holes 82 of the first internal gear 46 axially open toward the bottom section 79 of the flange portion 73 of the first internal gear 46.

Therefore, the primary through-holes 82 can be formed without using a slide core at the time of manufacturing the first internal gear 46 by, for example, a metal sintering process using a die. Thus, the through-holes for making the electrical connections of the motor can be formed without requiring an additional post-processing, so that the manufacturing costs can be reduced.

Furthermore, in the first embodiment, the primary through-holes 82 of the first internal gear 46 are located on the radially inner side of the tips of the internal teeth 74.

Thus, at the time of manufacturing the first internal gear 46 through press working, the primary through-holes 82 can be formed without using the slide core by performing a drawing process or a process of forming the internal teeth on a preform, in which holes corresponding to the primary through-holes 82 are formed. Therefore, the through-holes for making the electrical connections of the motor can be formed without requiring an additional post-processing, so that the manufacturing costs can be reduced.

Furthermore, in the first embodiment, the rotational angle sensing device 60 is placed at the location, which axially coincides with the location of the output member 52 and is radially displaced from the rotational axis AX1.

Thus, the rotational angle sensing device 60 can be provided in the axial space for placing the output member 52. Thus, it is possible to reduce or minimize the axial size of the rotational drive apparatus 10.

Furthermore, in the first embodiment, the rotational angle sensing device 60 forms the closed magnetic circuit, which radially outwardly opens, through use of the first magnet 61, the second magnet 62, the first yoke 63, and the second yoke 64.

In this way, the magnetic flux density sensing device 66 is placed in the inside of the closed magnetic circuit by radially inserting the magnetic flux density sensing device 66 into the output member 52. Thus, in the first embodiment, the axial size of the rotational drive apparatus 10 can be reduced or minimized in comparison to a case where the magnetic flux density sensing device 66 is axially inserted into, for example, the output member. Furthermore, a source of a disturbing magnetic field can be placed remotely from the rotational angle sensing device 60.

Furthermore, in the first embodiment, the first housing 15 has the quaternary through-hole 85 that is located on a radially outer side of the closed magnetic circuit and extends through the first housing 15 in the perpendicular direction. The magnetic flux density sensing device 66 is inserted in the quaternary through-hole 85 from the outside into the inside of the first housing 15.

Thus, at the time of forming the tertiary through-holes 84 for making the electrical connections of the motor 30 and the quaternary through-hole 85 for inserting the magnetic flux density sensing device 66 in the first housing 15, these through-holes 84, 85 can be formed in the first housing 15 in the common direction. Therefore, in the case where the tertiary through-holes 84 and the quaternary through-hole 85 are formed through a machining process, these through-holes 84, 85 can be formed in one step (single step). Furthermore, in the case where the tertiary through-holes 84 and the quaternary through-hole 85 are simultaneously formed at the time of molding the first housing 15, these through-holes 84, 85 can be easily formed in the first housing 15 in a demolding process.

Furthermore, in the first embodiment, the power terminals 26, the signal terminals 27, and the magnetic flux density sensing device 66 are insert molded into the connector 25, which is the one-piece member and is made of resin.

Therefore, the fixation of the power terminals 26, the signal terminals 27, and the magnetic flux density sensing device 66, and the sealing of the tertiary through-holes 84 and the quaternary through-hole 85 can be simultaneously performed by assembling the connector 25 to the first housing 15. Therefore, the number of the components and the number of the assembling steps can be reduced.

Furthermore, in the first embodiment, the motor 30 is fixed to the flange portion 73 of the first internal gear 46. The internally-toothed portion 71 of the first internal gear 46 is press fitted to the first housing 15.

In this way, the motor 30 and the first internal gear 46 are fixed to the first housing 15 by the strained force exerted through the press fitting of the internally-toothed portion 71 of the first internal gear 46 to the first housing 15. Therefore, it is not required to provide a separate dedicated member, which fixes the motor 30 to the first housing 15. Thus, the number of the components and the number of the assembling steps can be reduced.

In the first embodiment, the internal teeth 74 of the first internal gear 46 are designed such that the ideal meshed state between the internal teeth 74 of the first internal gear 46 and the external teeth 47a of the first planetary gear 47 is achieved in the state where the outer diameter of the first internal gear 46 is reduced upon the press fitting of the internally-toothed portion 71 of the first internal gear 46 to the third cylindrical surface 18 of the first housing 15. In other words, in order to achieve the reduced outer diameter of the first internal gear 46 in a stable manner, the outer peripheral part of the internally-toothed portion 71, which is located on the radially outer side of the internal teeth 74, is press fitted to the third cylindrical surface 18 of the first housing 15.

Thus, it is possible to avoid the trochoid interference and the involute interference, which would be caused by the deformation of the teeth that is in turn induced by the press fitting.

Furthermore, in the first embodiment, the motor 30 is urged against the flange portion 73 of the first internal gear 46 by the wave washer 89.

Thus, the motor 30 is supported at two axial sides of the motor 30, and vibrations of the motor 30 can be absorbed by the wave washer 89. Therefore, the damage of the motor 30 caused by the vibrations can be limited.

Here, in order to open or close the waste gate valve 105, it is only required to provide an operational force, which is larger than an average value of pulsed forces exerted against the waste gate valve 105 by the exhaust gas pulsation. In contrast, in order to fully close the waste gate valve 105, it is required to provide an operational force, which is larger than a peak value of the pulsed forces. When the operational force is equal to or smaller than the peak value, gas leakage occurs from the waste gate valve 105 to result in a reduction in the boost efficiency of the turbocharger 101.

In contrast, according to the first embodiment, the speed reducer 40 is constructed to reduce the rotational speed of the rotation at the time of transmitting the rotation from the motor 30 to the output shaft 35. Therefore, a backward efficiency becomes smaller than a forward efficiency. Here, the forward efficiency is defined as an efficiency for transmitting the power from the motor 30 to the output shaft 35, and the backward efficiency is defined as an efficiency for transmitting the power from the output shaft 35 to the motor 30.

Therefore, according to the first embodiment, the required torque, which is a torque required to be outputted from the rotational drive apparatus 10 at the time of fully closing the waste gate valve 105, i.e., a torque required to hold the waste gate valve 105 at the full closing position, can be smaller in comparison to, for example, a comparative case where a parallel shaft speed reducer (also referred to as a parallel shaft gear reducer), in which the forward efficiency and the backward efficiency are equal to each other, is used in the rotational drive apparatus. Thus, the electric power consumption at the time of fully closing the waste gate valve 105 can be reduced. In other words, the size of the speed reducer 40 can be reduced in the case where the rotational drive apparatus is designed to have the electric power consumption that is the same as that of the comparative case at the time of fully closing the waste gate valve 105.

Second Embodiment

A rotational drive apparatus according to a second embodiment of the present disclosure will be described with reference to FIGS. 11 and 16 to 18.

Figure 16:
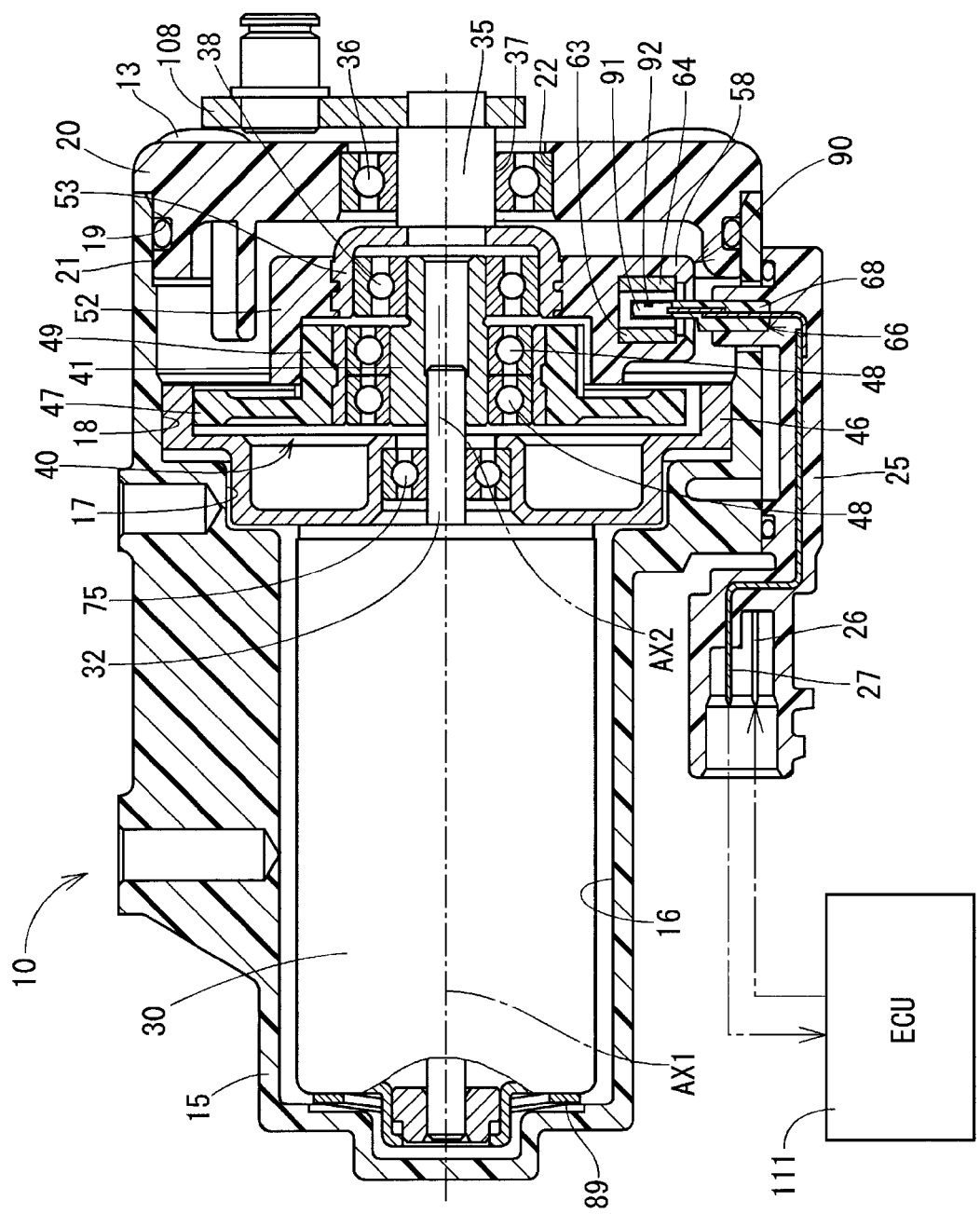
FIG. 16 is a cross-sectional view of a rotational drive apparatus according to a second embodiment of the present disclosure.
Figure 17:
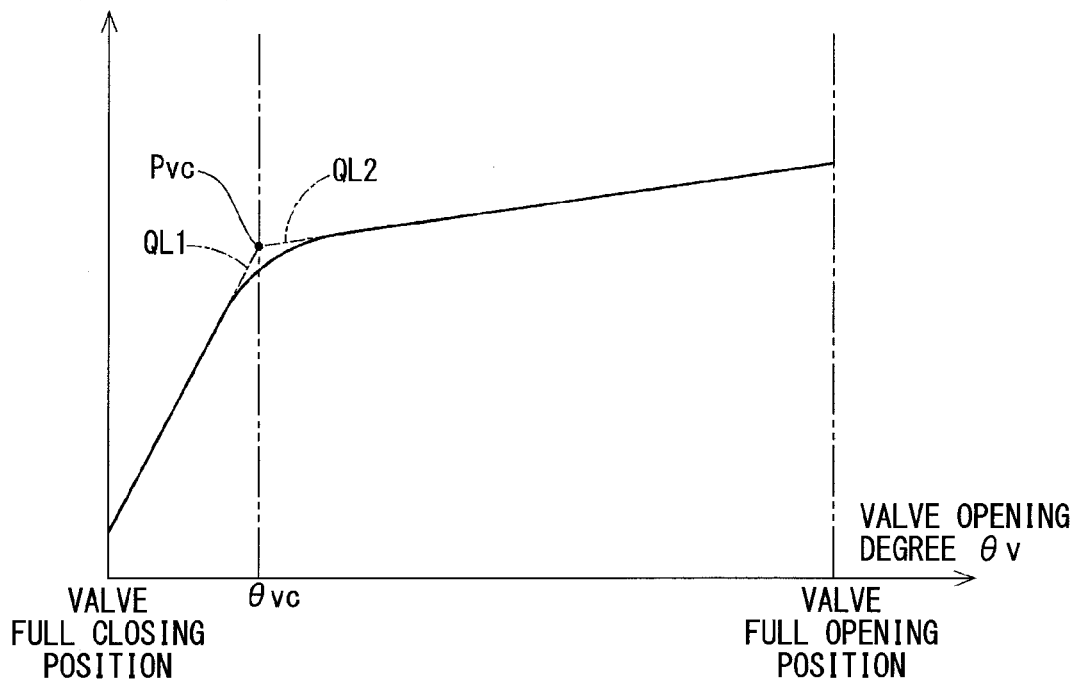
FIG. 17 is a diagram showing a flow quantity characteristic of the waste gate valve shown in FIG. 1.
Figure 18:
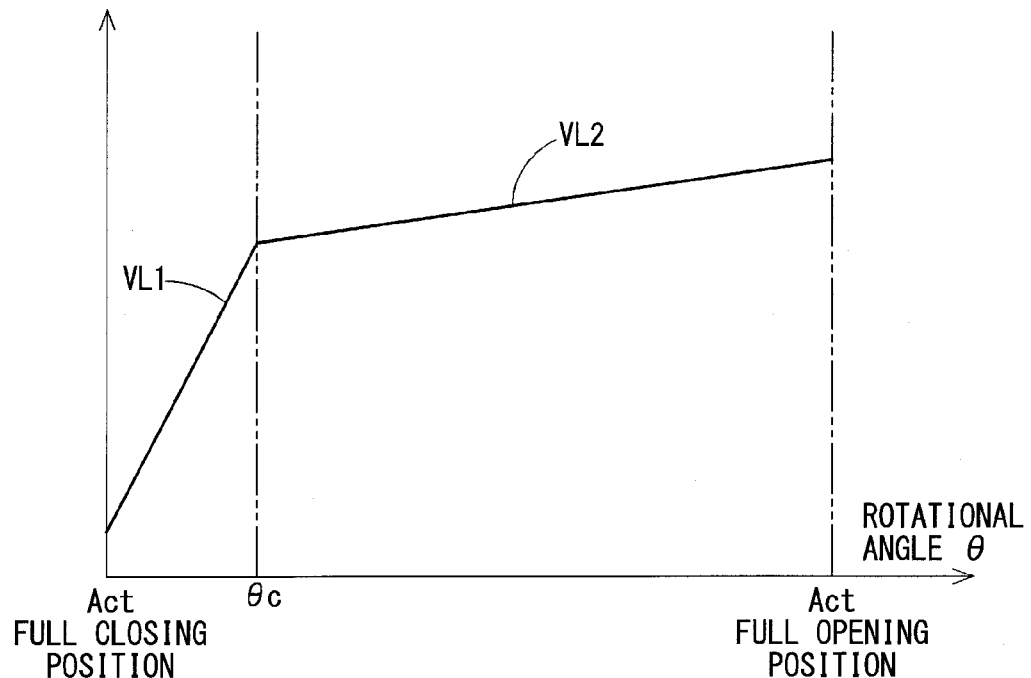
FIG. 18 is a diagram showing an output characteristic after correction made by a correcting device of a Hall IC shown in FIG. 16.

In the second embodiment, a Hall IC 91 of the rotational angle sensing device 90 shown in FIG. 16 has a correcting device, which uses a multipoint correction method, to correct the output signal V of the Hall element 92 shown in FIG. 11 to a corrected output signal Vh shown in FIG. 18 based on a flow quantity characteristic of the waste gate valve 105 shown in FIG. 17, so that it is possible to achieve an output characteristic of that a change in the output of the Hall IC 91 relative to the rotational angle θ of the output member 52 becomes non-linear.

Specifically, the flow quantity characteristic of the exhaust gas, which passes through the waste gate valve 105, shows changes shown in FIG. 17. That is, when a valve opening degree θv of the waste gate valve 105 is relatively small, a flow quantity Q rapidly changes. In contrast, when the valve opening degree θv of the waste gate valve 105 is relatively large, the flow quantity Q slowly changes. In other words, a change rate of the flow quantity Q at a low valve opening degree side, which is lower than a flow quantity flexion point Pvc, differs from a change rate of the flow quantity Q at a high valve opening degree side, which is higher than the flow quantity flexion point Pvc. The flow quantity flexion point Pvc is an intersection point between a characteristic approximation straight line QL1 at the low valve opening degree side of the waste gate valve 105 and a characteristic approximation straight line QL2 at the high valve opening degree side. Hereinafter, the valve opening degree of the waste gate valve 105 at the flow quantity flexion point Pvc will be referred to as a predetermined valve opening degree θvc.

In conformity with the flow quantity characteristic discussed above, the correcting device of the Hall IC 91, which uses the multipoint correction method, corrects the output signal V of the Hall element 69 such that in the low valve opening degree range (low valve opening degree side) of the waste gate valve 105, in which the rotational angle θ of the waste gate valve 105 (or the rotational angle of the output member 52) is smaller than a predetermined rotational angle θc that corresponds to the predetermined valve opening degree θvc shown in FIG. 17, the change (change rate) of the corrected output signal Vh is relatively large (larger than a predetermined value), as indicated by the characteristic straight line VL1 in FIG. 18. Furthermore, the correcting device of the Hall IC 91, which uses the multipoint correction method, corrects the output signal V of the Hall element 69 such that in the high valve opening degree range (high valve opening degree side) of the waste gate valve 105, in which the rotational angle θ of the waste gate valve 105 (or the rotational angle of the output member 52) is larger than the predetermined rotational angle θc, the change (change rate) of the corrected output signal Vh is relatively small (smaller than the predetermined value), as indicated by the characteristic straight line VL2 in FIG. 18.

According to the second embodiment, it is possible to have the characteristic straight line VL1 of the low valve opening degree side, which is on the lower side of the predetermined rotational angle θc shown in FIG. 18, and the characteristic straight line VL2 of the high valve opening degree side, which is on the higher side of the predetermined rotational angle θc shown in FIG. 18. In this way, it is possible to increase the sensitivity of the corrected output signal Vh relative to the rotational angle θ at the low valve opening degree side where the change rate of the flow quantity Q is relatively large, and thereby the controllability of the boost pressure at the lower valve opening degree side can be improved.

Now, modifications of the above embodiment(s) will be described.

In the first embodiment, the speed reducer has the first speed reducing arrangement, which includes the first internal gear and the first planetary gear, and the second speed reducing arrangement, which includes the second internal gear and the second planetary gear. Alternatively, in a modification of the above embodiment(s), in place of the second speed reducing arrangement, there may be provided a rotation transmitting device, which transmits the rotation of the first planetary gear, which rotates about the eccentric axis, to the output shaft without changing the rotational speed of the rotation of the first planetary gear.

In another modification of the above embodiment(s), the axial location of the internally-toothed portion of the first internal gear may coincide with the axial location of the bearing portion. In such a case, the flange portion may be configured into a circular disk body, which connects between one end part of the internally-toothed portion and one end part of the bearing portion.

In another modification of the above embodiment(s), the first internal gear may be fixed to the first housing through, for example, a fixing member, instead of fitting the first internal gear to the first housing.

In another modification of the above embodiment(s), each tooth of the first internal gear, each tooth of the first planetary gear, each tooth of the second internal gear, and each tooth the second planetary gear may have another tooth shape, which is other than the trochoidal tooth shape. For instance, each tooth of the first internal gear, each tooth of the first planetary gear, each tooth of the second internal gear, and each tooth the second planetary gear may have an involute tooth shape.

In another modification of the above embodiment(s), the difference between the number of the internal teeth of the first internal gear and the number of the external teeth of the first planetary gear and the difference between the number of the internal teeth of the second internal gear and the number of the external teeth of the second planetary gear may be 2 (two) or larger than 2 (two).

In another modification of the above embodiment(s), the second planetary gear may be formed from another member, which is formed separately from the first planetary gear. Furthermore, the first planetary gear and the second planetary gear may be made of a material, which does not include the fluorine resin.

In another modification of the above embodiment(s), the primary through-holes and the secondary through-holes may be eliminated from the first internal gear. Furthermore, the motor terminals of the motor may be connected to the power terminals at the outside of the flange portion of the first internal gear.

In another modification of the above embodiment(s), the closed magnetic circuit, which is formed by the magnets and the yokes of the rotational angle sensing device, may open in another direction (e.g., an axial direction) that is other than the radial direction. Furthermore, the magnetic flux density sensing device of the rotational angle sensing device may be inserted into the closed magnetic circuit in the axial direction.

In another modification of the above embodiment(s), the power terminals may be formed integrally in another connector, which is a different member that is different form the connector having the signal terminals.

In another modification of the above embodiment(s), the wave washer may be eliminated from the end portion of the motor.

In another modification of the above embodiment(s), the number the Hall IC is not limited to one. That is, the number of the Hall ICs may be two or more.

In another modification of the above embodiment(s), the first housing and the second housing may be joined together by any other means, which is other than the screw(s). For instance, the first housing and the second housing may be joined together by, for example, press fitting or staking (plastic deformation of one of the first and second housings against the other one of the first and second housings).

In another modification of the above embodiment(s), in place of the link mechanism, another type of transmission mechanism may be provided. That is, it is only required that the transmission mechanism can transmit the rotation of the output shaft of the rotational drive apparatus to the waste gate valve.

In another modification of the above embodiment(s), the link mechanism may not reduce the rotational speed of the rotation transmitted through the link mechanism.

Figure 19:
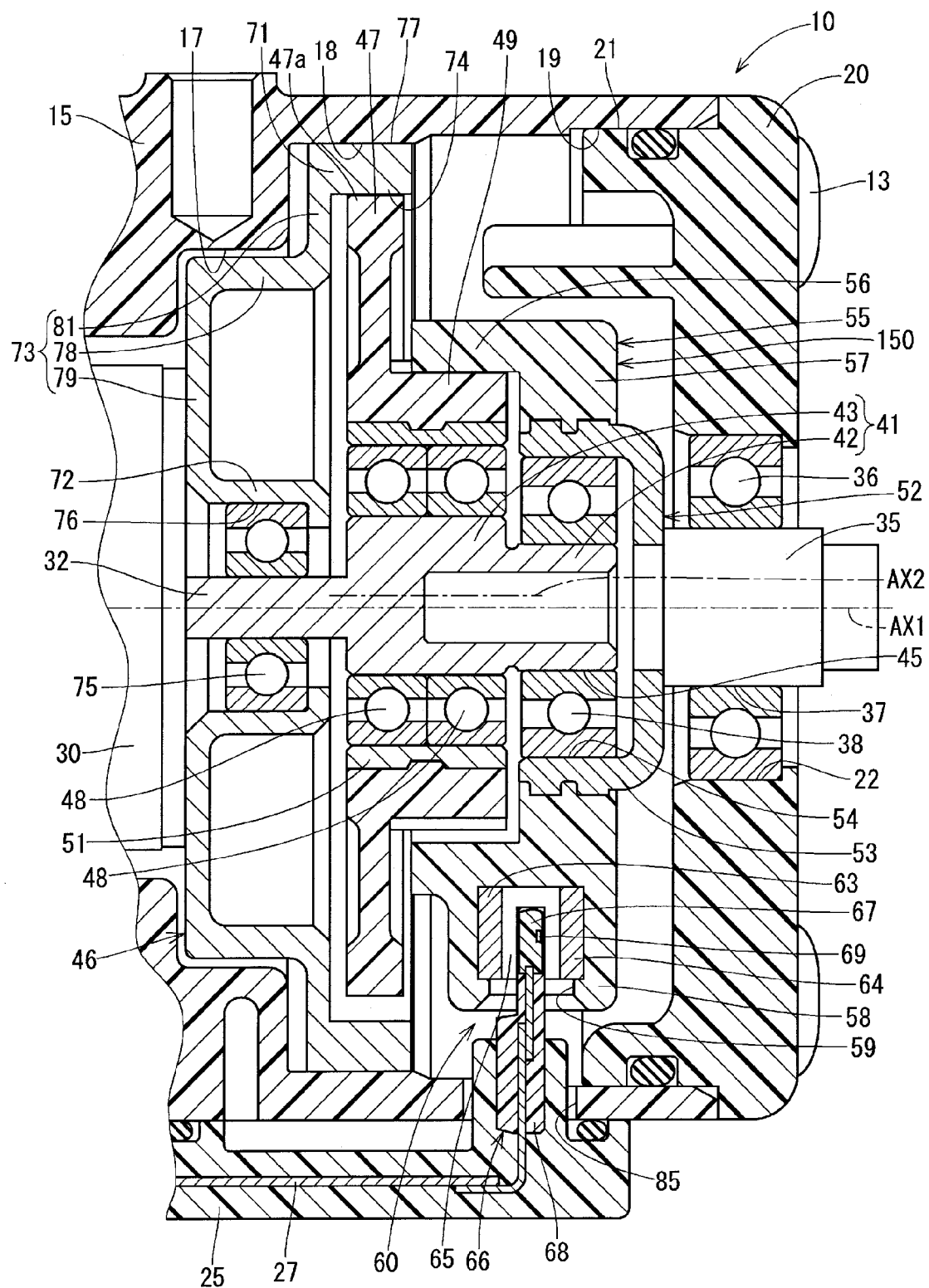
FIG. 19 is a partial enlarged cross-sectional view of a rotational drive apparatus in a modification of the first embodiment.

In a modification of the above embodiment(s), the motor shaft 32 and the eccentric shaft 41 may be integrally and seamlessly formed as a one-piece member from, for instance, metal (or resin), as indicated in FIG. 19 that shows a modification of the rotational drive apparatus 10 of FIG. 6 of the first embodiment.

In another modification of the above embodiment(s), the connection between the motor shaft and the eccentric shaft may be made by another method, such as spline fitting.

In another modification of the above embodiment(s), the motor is not limited to the DC motor and may be formed as another type of electric motor, which is other than the DC motor.

In another modification of the above embodiment(s), the waste gate valve apparatus, in which the rotational drive apparatus of the present disclosure is applied, may be formed separately from the turbocharger.

In another modification of the above embodiment(s), the rotational drive apparatus is not limited to be applied to the waste gate valve apparatus and may be applied to another apparatus, such as a variable vane control apparatus of a variable volume turbocharger, a valve drive apparatus of an exhaust throttle or an exhaust selector valve, or a valve drive apparatus of a variable intake mechanism.

The present disclosure is not limited the above embodiments and modifications thereof. That is, the above embodiments and modifications thereof may be further modified in various ways without departing from the principle of the present disclosure.

What is claimed is:

1. A rotational drive apparatus comprising:
a first housing;
an electric motor that is received in the first housing;
a second housing that is fitted to the first housing and is fixed to the first housing;
an output shaft that is coaxial with a motor shaft of the electric motor and is rotatably supported by the second housing;
an eccentric shaft that is eccentric to the motor shaft and is rotatable integrally with the motor shaft;
a first internal gear that is coaxial with the motor shaft and is formed separately from the first housing and the second housing, wherein the first internal gear is entirely received in an inside of the first housing and is non-rotatably fitted to an inner wall surface of the first housing;
a first planetary gear that is meshed with the first internal gear from a radially inner side of the first internal gear, wherein the first planetary gear is rotatably supported by the eccentric shaft to enable rotation of the first planetary gear around the eccentric shaft, and at a time of rotating the motor shaft, the first planetary gear revolves around the motor shaft while changing a meshed location of the first planetary gear that is meshed with the first internal gear, and the first planetary gear is rotated about the eccentric shaft at a reduced speed that is reduced from a rotational speed of the motor shaft; and
a rotation transmitting device that transmits rotation of the first planetary gear, which is rotated about the eccentric shaft, to the output shaft, wherein:
the first internal gear is a one-piece member and is formed separately from the first housing, wherein the first internal gear includes:
an internally-toothed portion that is tubular and is fitted to the first housing, wherein the internally-toothed portion has a plurality of internal teeth that are meshed with a plurality of external teeth of the first planetary gear;
a bearing portion, which is configured into a tubular form and supports the motor shaft; and
a flange portion, which connects between the internally-toothed portion and the bearing portion.

2. The rotational drive apparatus according to claim 1, wherein the rotation transmitting device further comprises:
a second planetary gear that is rotatably supported by the eccentric shaft to enable rotation of the second planetary gear about the eccentric shaft, wherein the second planetary gear is formed integrally and seamlessly with the first planetary gear; and
a second internal gear that is coaxial with the output shaft and is meshed with the second planetary gear from a radially outer side of the second planetary gear, wherein the second internal gear is rotatable integrally with the output shaft, and at a time of rotating the second planetary gear integrally with the first planetary gear about the eccentric shaft while revolving the second planetary gear about the motor shaft, the second internal gear rotates about the motor shaft at a reduced rotational speed that is reduced from a rotational speed of the second planetary gear, which is rotated about the eccentric shaft.

3. The rotational drive apparatus according to claim 2, wherein the first internal gear, the first planetary gear, the second internal gear and the second planetary gear each include teeth and each tooth of the first internal gear, each tooth of the first planetary gear, each tooth of the second internal gear, and each tooth of the second planetary gear are configured into a trochoidal tooth shape.

4. The rotational drive apparatus according to claim 3, wherein a difference between a number of the plurality of internal teeth of the first internal gear and a number of the plurality of external teeth of the first planetary gear is one.

5. The rotational drive apparatus according to claim 2, wherein the second planetary gear is formed integrally and seamlessly with the first planetary gear as a one-piece member from fluorine resin or a material that contains the fluorine resin.

6. The rotational drive apparatus according to claim 1, wherein:
the internally-toothed portion is axially displaced from the bearing portion;
the flange portion is placed on a radially outer side of the bearing portion and includes:
a tubular section that is connected to the internally-toothed portion; and
a bottom section that connects between an end part of the tubular section, which is opposite from the internally-toothed portion of the tubular section, and the bearing portion;
the tubular section of the flange portion includes a primary through-hole that radially extends through the tubular section; and
the bottom section of the flange portion includes a secondary through-hole that axially extends through the bottom section and receives a motor terminal of the electric motor.

7. The rotational drive apparatus according to claim 6, wherein:
a direction, which is perpendicular to a rotational axis of the motor shaft, is defined as a perpendicular direction;
a direction, which is parallel to the perpendicular direction, is defined as a parallel direction;
the first housing includes a tertiary through-hole that extends through the first housing in the perpendicular direction or the parallel direction and is communicated with the primary through-hole of the first internal gear; and
the rotational drive apparatus further comprises a connector that includes a power terminal, which extends through the tertiary through-hole and the primary through-hole and is connected to the motor terminal while the connector is fixed to the first housing.

8. The rotational drive apparatus according to claim 7, further comprising a rotational angle sensing device that is placed at a location, which axially coincides with a location of the rotation transmitting device and is radially displaced from the rotational axis, wherein the rotational angle sensing device senses a rotational angle of the output shaft.

9. The rotational drive apparatus according to claim 8, wherein the rotational angle sensing device includes:
a first magnet that is magnetized in one direction, which is defined along a north pole and a south pole of the first magnet in parallel to an axial direction of the output shaft;
a second magnet that is magnetized in an opposite direction, which is defined along a north pole and a south pole of the second magnet in parallel to the axial direction of the output shaft and is opposite from the one direction, wherein the second magnet is placed at a location that is spaced from the first magnet in a rotational direction of the output shaft;
a first yoke that has an arcuate shape and extends in the rotational direction of the output shaft, wherein the first yoke between the north pole of the first magnet and the south pole of the second magnet;
a second yoke that has an arcuate shape and extends in the rotational direction of the output shaft, wherein the second yoke between the north pole of the second magnet and the south pole of the first magnet, and the second yoke cooperates with the first magnet, the second magnet, and the first yoke to form a closed magnetic circuit; and
a magnetism sensing device that is placed in a gap, which is formed between the first yoke and the second yoke and radially opens.

10. The rotational drive apparatus according to claim 9, wherein the magnetism sensing device includes a magnetic flux density sensing element that outputs a signal, which corresponds to a density of a magnetic flux passing though the magnetic flux density sensing element.

11. The rotational drive apparatus according to claim 10, wherein the rotational drive apparatus is a drive source of a waste gate valve apparatus.

12. The rotational drive apparatus according to claim 9, wherein:
the first housing has a quaternary through-hole that is located on a radially outer side of the closed magnetic circuit and extends through the first housing in the perpendicular direction, wherein the quaternary through-hole receives the magnetism sensing device, which is inserted into the quaternary through-hole from an outside into an inside of the first housing; and
the connector further includes a signal terminal, which is connected to the magnetism sensing device.

13. The rotational drive apparatus according to claim 6, wherein the primary through-hole axially opens toward the bottom section of the flange portion of the first internal gear.

14. The rotational drive apparatus according to claim 6, wherein the primary through-hole of the first internal gear is located on a radially inner side of tips of the plurality of internal teeth of the first internal gear.

15. The rotational drive apparatus according to claim 1, wherein:
the electric motor is fixed to the flange portion of the first internal gear; and
the internally-toothed portion of the first internal gear is press fitted to the first housing.

16. The rotational drive apparatus according to claim 15, wherein:
the first internal gear contacts the first housing only through an outer peripheral part of the internally-toothed portion, which is located on a radially outer side of the plurality of internal teeth; and
the rest of the first internal gear, which is other than the outer peripheral part of the internally-toothed portion located on the radially outer side of the plurality of internal teeth, is spaced away from the first housing.

17. The rotational drive apparatus according to claim 1, further comprising an urging member that urges the electric motor against the flange portion of the first internal gear.

18. The rotational drive apparatus according to claim 1, wherein the motor shaft and the eccentric shaft are integrally and seamlessly formed as a one-piece member.

19. The rotational drive apparatus according to claim 1, wherein the flange portion includes a tubular section between an inner radial flange and an outer radial flange to form a step shaped profile.

20. A rotational drive apparatus comprising:
a first housing;
an electric motor that is received in the first housing;
a second housing that is fitted to the first housing and is fixed to the first housing;
an output shaft that is coaxial with a motor shaft of the electric motor and is rotatably supported by the second housing;
an eccentric shaft that is eccentric to the motor shaft and is rotatable integrally with the motor shaft;
a first internal gear that is coaxial with the motor shaft and is non-rotatably fitted to the first housing;
a first planetary gear that is meshed with the first internal gear from a radially inner side of the first internal gear, wherein the first planetary gear is rotatably supported by the eccentric shaft to enable rotation of the first planetary gear around the eccentric shaft, and at a time of rotating the motor shaft, the first planetary gear revolves around the motor shaft while changing a meshed location of the first planetary gear that is meshed with the first internal gear, and the first planetary gear is rotated about the eccentric shaft at a reduced speed that is reduced from a rotational speed of the motor shaft; and
a rotation transmitting device that transmits rotation of the first planetary gear, which is rotated about the eccentric shaft, to the output shaft, wherein:
the first internal gear is a one-piece member and is formed separately from the first housing, wherein the first internal gear includes:
an internally-toothed portion that is tubular and is fitted to the first housing, wherein the internally-toothed portion has a plurality of internal teeth that are meshed with a plurality of external teeth of the first planetary gear;
a bearing portion, which is configured into a tubular form and supports the motor shaft; and
a flange portion, which connects between the internally-toothed portion and the bearing portion,
the internally-toothed portion is axially displaced from the bearing portion;
the flange portion is placed on a radially outer side of the bearing portion and includes:
a tubular section that is connected to the internally-toothed portion; and
a bottom section that connects between an end part of the tubular section, which is opposite from the internally-toothed portion of the tubular section, and the bearing portion;
the tubular section of the flange portion includes a primary through-hole that radially extends through the tubular section; and
the bottom section of the flange portion includes a secondary through-hole that axially extends through the bottom section and receives a motor terminal of the electric motor.

* * * * *